United States Patent
Körösi et al.

(10) Patent No.: US 10,757,856 B2
(45) Date of Patent: Sep. 1, 2020

(54) SEED COUNTING SENSOR AND METHOD FOR DETECTING BLOCKAGE OF A SEED CONVEYING PIPE

(71) Applicant: DIGITROLL KFT., Hajdúszoboszló (HU)

(72) Inventors: Gergö Körösi, Hajdúszoboszló (HU); Tamás Csatári, Hajdúböszörmény (HU); Csaba Erdei, Hajdúszoboszló (HU); János Silye, Hajdúszoboszló (HU)

(73) Assignee: Digitroll Ktf., Hajdúszoboszló (HU)

( * ) Notice: Subject to any disclaimer, the term of this patent is extended or adjusted under 35 U.S.C. 154(b) by 0 days.

(21) Appl. No.: 15/754,645

(22) PCT Filed: Aug. 22, 2016

(86) PCT No.: PCT/HU2016/050036
§ 371 (c)(1),
(2) Date: Feb. 23, 2018

(87) PCT Pub. No.: WO2017/033034
PCT Pub. Date: Mar. 2, 2017

(65) Prior Publication Data
US 2018/0255698 A1    Sep. 13, 2018

(30) Foreign Application Priority Data

Aug. 24, 2015  (EP) .................................... 15462004

(51) Int. Cl.
*A01C 7/10*  (2006.01)
*A01C 7/08*  (2006.01)
*G06M 1/10*  (2006.01)

(52) U.S. Cl.
CPC .............. *A01C 7/105* (2013.01); *A01C 7/081* (2013.01); *G06M 1/101* (2013.01)

(58) Field of Classification Search
CPC ......... A01C 7/046; A01C 7/081; A01C 7/102; A01C 7/105; B65G 53/66; G01F 23/2921;
(Continued)

(56) References Cited

U.S. PATENT DOCUMENTS 3,140,055 A * 7/1964 Long ...................... F21V 17/04
                                                     362/223
3,890,568 A * 6/1975 Coulter .............. G01N 15/1227
                                                     377/11
(Continued)

*Primary Examiner* — Stephen R Burgdorf
(74) *Attorney, Agent, or Firm* — Jason D. Voight

(57) ABSTRACT

The seed counting sensor (200) for pneumatic seeding machines comprises a detection chamber (210) within a house (204), said detection chamber allowing the seeds to pass through the sensor and having a center axis (211) extending in the flow direction of the seeds (102); a plurality of light sources (240) arranged within the house (204), outside the detection chamber (210), at predetermined distances from each other, said light sources being in a plane (P) extending substantially perpendicularly to said center axis of the sensor; a plurality of light detectors (250) arranged within the house (204), outside the detection chamber (210) at predetermined distances from each other, said light detectors being in the same plane (P) as the light sources, wherein the number of the light detectors equals to the number of the light sources, and a signal processing unit (502) for controlling operation of the light sources (240) and for processing the electronic signals produced by the light detectors (250).

7 Claims, 18 Drawing Sheets

(58) Field of Classification Search
CPC ........ G01N 15/1459; G01V 8/20; G01V 8/22; G06M 1/101; G06M 7/00
USPC ........................................................ 340/684
See application file for complete search history.

(56) References Cited

U.S. PATENT DOCUMENTS

| | | | | |
|---|---|---|---|---|
| 3,942,866 | A | * | 3/1976 | Roman .................. G02B 23/26 385/115 |
| 4,634,855 | A | | 1/1987 | Friend et al. |
| 5,883,383 | A | * | 3/1999 | Dragne .................. A01O 7/105 250/222.2 |
| 6,016,194 | A | * | 1/2000 | Girvin ................ G01N 15/1425 356/335 |
| 6,093,926 | A | * | 7/2000 | Mertins .................. A01C 7/105 250/222.1 |
| 6,158,363 | A | | 12/2000 | Memory et al. |
| 6,373,057 | B1 | * | 4/2002 | Penfold .................. A01C 7/105 250/221 |
| 7,630,063 | B2 | * | 12/2009 | Padmanabhan .... G01N 15/1484 356/246 |
| 8,843,281 | B2 | | 9/2014 | Wilhelmi et al. |
| 2004/0011975 | A1 | * | 1/2004 | Nicoli ................ G01N 15/0227 250/574 |
| 2010/0264163 | A1 | | 10/2010 | Tevs et al. |
| 2011/0303137 | A1 | | 12/2011 | Tevs et al. |
| 2012/0067262 | A1 | * | 3/2012 | Wilhelmi ............... A01O 7/105 111/183 |
| 2016/0374263 | A1 | | 12/2016 | Steffen et al. |

\* cited by examiner

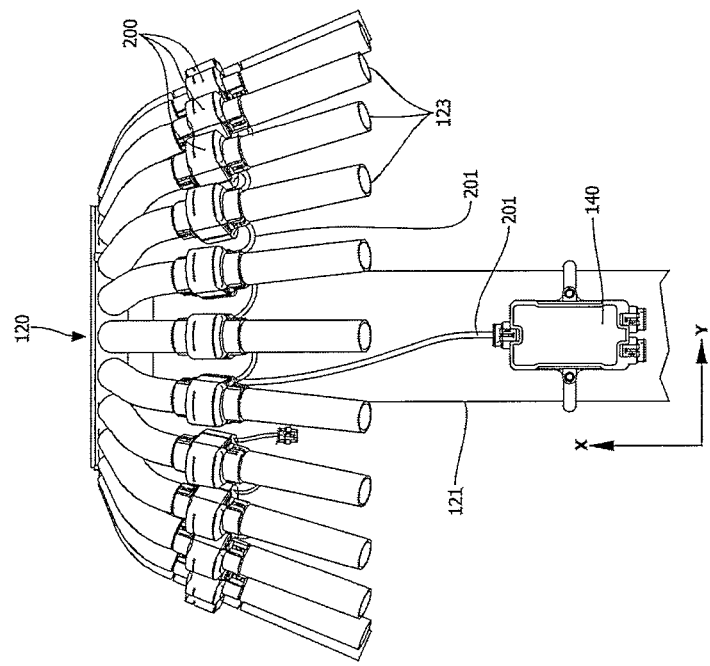
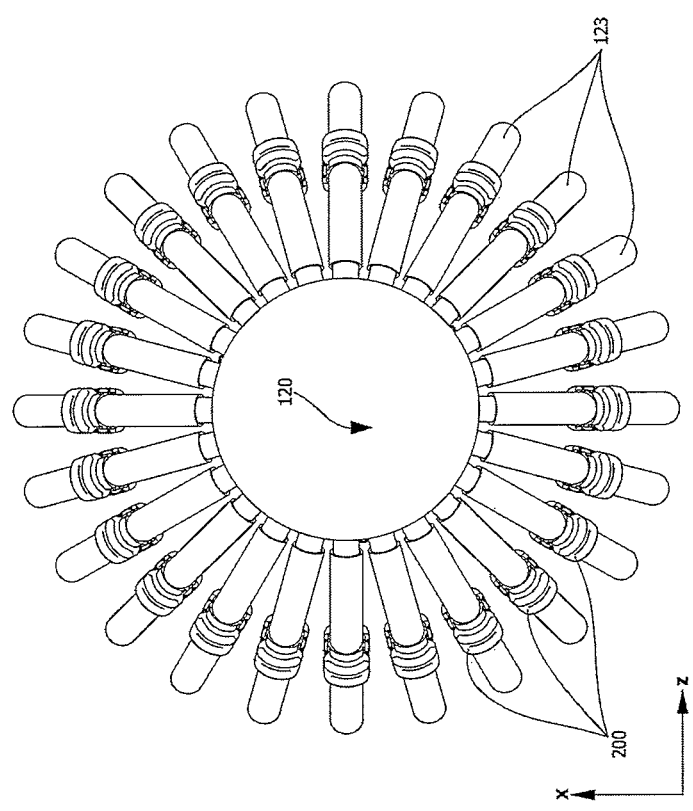
Fig. 3

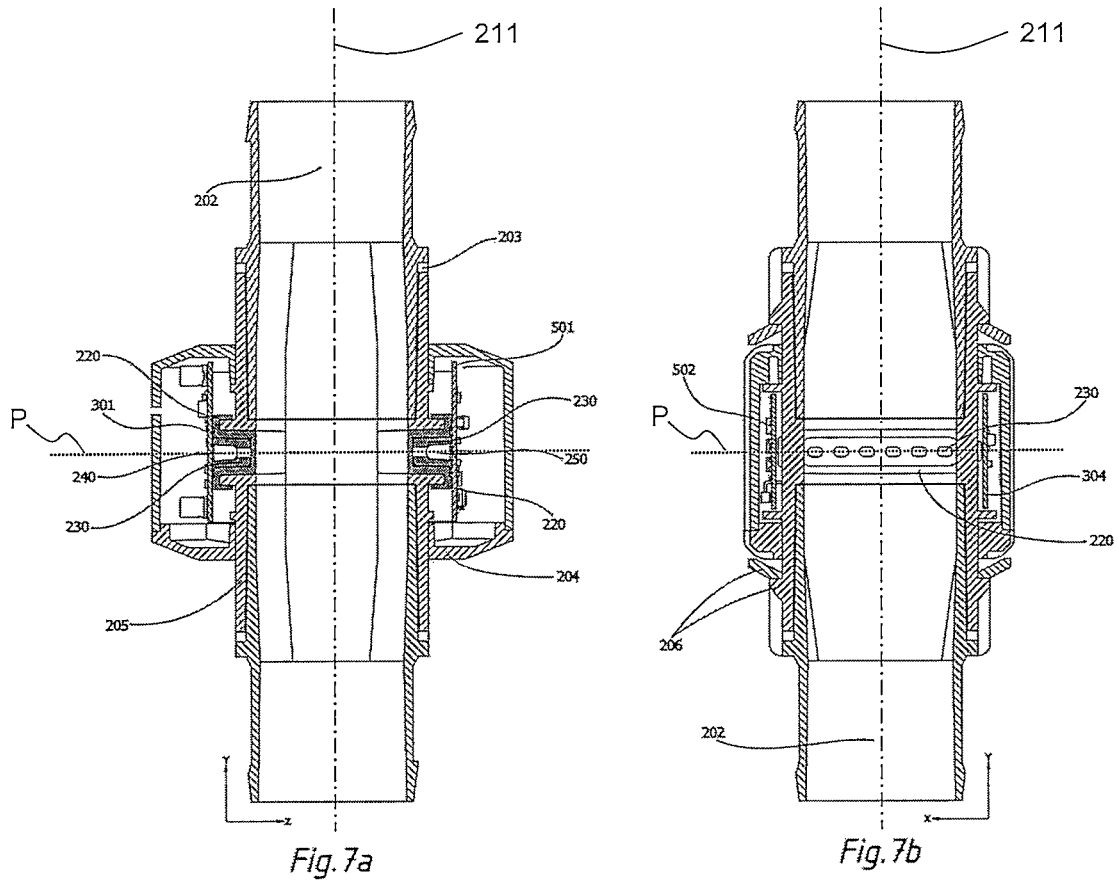
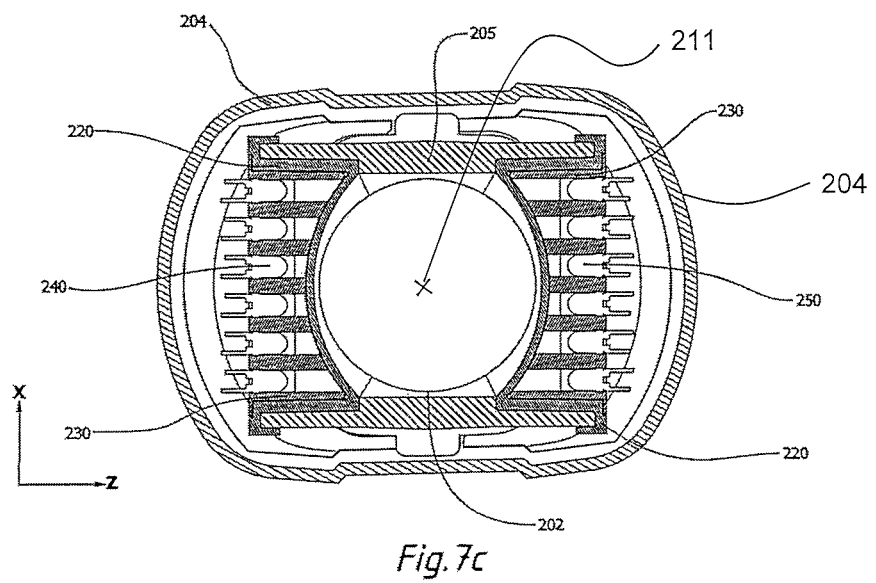

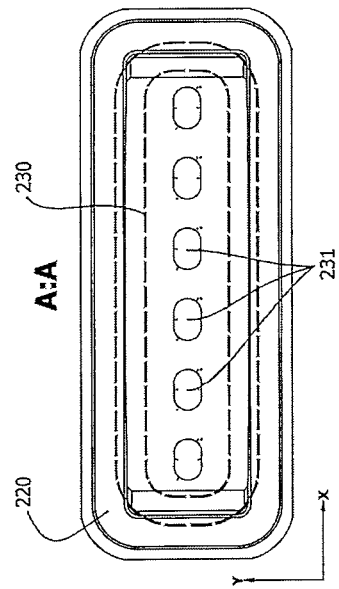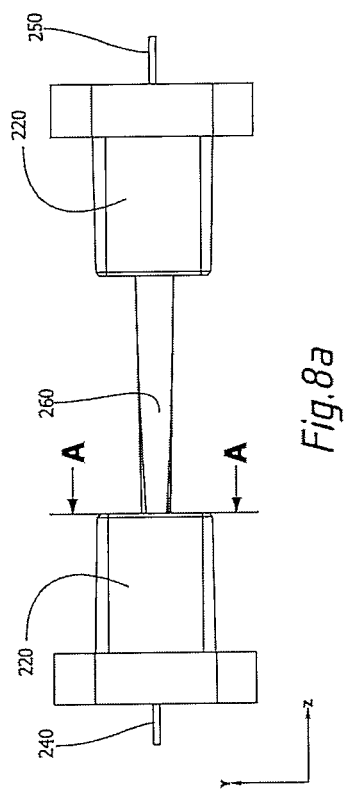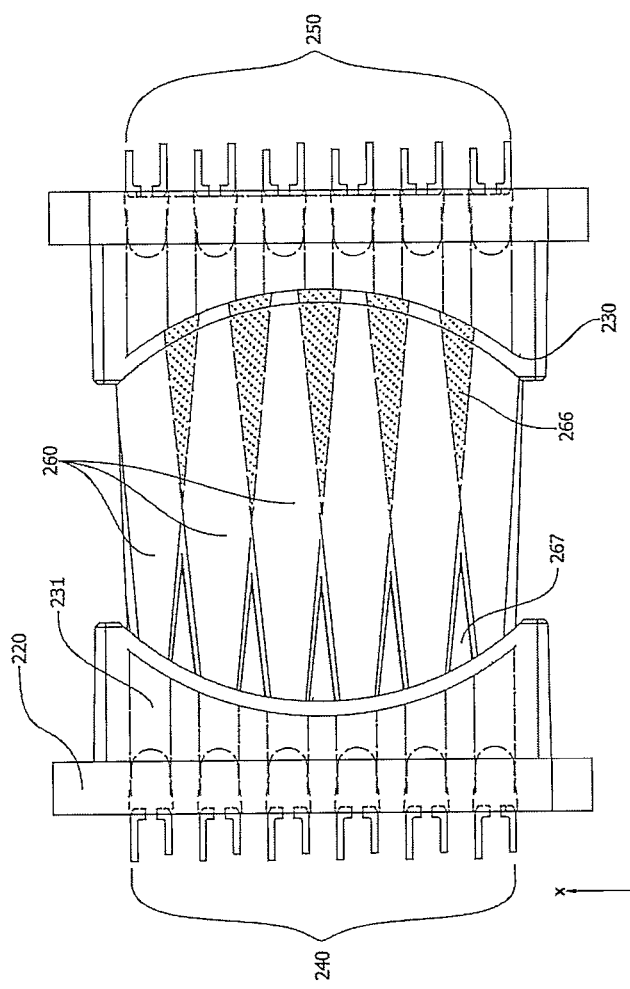

SEED COUNTING SENSOR AND METHOD FOR DETECTING BLOCKAGE OF A SEED CONVEYING PIPE

This is the national stage of International Application PCT/HU2016/050036, filed Aug. 22, 2016.

The present invention relates to a seed sensor and a method for detection of blockage of a seed conveying pipe.

BACKGROUND OF THE INVENTION

The proper operation of the seeding machines is supervised with a seed control system. The key elements of the seed control system include the seed sensors by means of which dispensing of the seeds can be supervised. The present invention primarily relates to seed sensors used in pneumatic grain seeding machines (wherein the seeds are conveyed to the soil by means of air), wherein the seed sensors provide real-time information on the accuracy of the seeding process and the faults of the seeding process for the operator of the seeding machine.

In the present state of the art numerous solutions are used to detect seeds during the seeding process. The most common solution is the use of so called seed detection sensors (seed sensors). The seed sensors are placed in the flow path of the seeds, therefore the seeds get to the soil with passing through the seed sensors. During seed control, the seed sensors have the function to determine whether or not the seeding machine is seeding, and to determine how many seeds are dispensed by the seeding machine within a specified time period. The seed sensors have the further function to determine if a seed conveying pipe is blocked. Various technical solutions may be applied to provide the above functions. The most common solutions are based on optical principles, but there also exist seed sensors operating with radio waves (radar), micro wave or on acoustical basis.

Most of the optical seed sensors operate using the principle of the optogate. In this solution light sources (transmitters) and light detectors (receivers) are arranged opposite to each other. Typically, the light sources are light emitting diodes (LED), whereas the light detectors are respective phototransistors or photodiodes, in general. The key point of the operation of the optogate-type seed sensors is that an object (such as a seed in the present case) passing between a transmitter (e.g. LEDs) and a receiver, produces a shadow on the receiver side, which, in turn, generates a signal in the signal processing circuit of the receiver.

The optogate-type seed sensors are basically classified into two types according to the control scheme of the light sources. The first type includes seed sensors in which the light sources operate continuously and with constant light intensity in the course of time. Regarding the operation (i.e. the control of the light sources and the signal processing) this solution is the simpler one and therefore it is also more common. The other group includes those optogate-type seed sensors in which the light intensity of the light sources is controlled by periodic signals, for example it is modulated by a constant frequency square pulse. In this case detection of the seeds takes place by virtue of the examination of the distortion of the signal detected on the receiver side. The number of the light sources and the number of the light detectors are selected depending on a specific place of the application, the shape and the dimensions of the seed sensing zone. The size of the seeds passing through a seed sensor may be even as small as 1 mm for small seeds (e.g. cabbage, rape), but for larger seeds the size may reach even 20 mm (e.g. horse-bean). The flow rate of the seeds passing through the seed sensors mostly depends on the type of the seeding machine since the currently used seeding machines dispense the seeds in two different ways. In one type of the machines, the seeds are mechanically dropped (these are the so called seed planters), wherein the seeds reach the soil due to the gravitation. In this case the flow rate of the seeds is regarded low. In the other type of seeding machines, the seeds are dispensed by means of air (these are the so called pneumatic seeding machines), in which, due to an intensive air stream, the flow rate of the seeds are comparatively higher. Certain types of seeds are dispensed in large doses, whereby the number of seeds passing through a seed sensor may reach even 300 seeds/sec, for example at wheat grain seeding. This case is called large dose dispensing.

Depending on the place of use, in view of the above features, the optical seed sensors may be classified into two major groups, one including the seed sensors used for seed planting, and the other one including the seeds sensor used for pneumatic seeding.

According to the present state of the art, the seed sensors used for seed planting are the most advanced devices in general as they detect seeds of both small and large sizes at high precision and provide accurate information on the seeding process. During seed planting the seed planter dispenses the seeds individually, therefore a seed sensor has to detect and count the seeds that are passing through the seed sensor successively. The seed sensors used for seed planting are adapted to control the dispensed amount of seeds and the spatial distribution of the dispensed seeds in real time. Such a seed sensor is disclosed, for example, in the U.S. Pat. No. 8,843,281. In this solution, along the side of the sensor, light sources are equidistally arranged on either side of a detection chamber and light detectors are equidistally arranged on the other side of the detection chamber opposite to the light sources, wherein the distances between the light sources and the light detectors are adjusted so that no dead space can develop in the seed sensor. Due to the high number of light detectors on the receiver side, the sensors can determine even the size of the seeds. The asymmetric arrangement used in this solution is beneficial to eliminate the dead space but it has an adverse effect to the physical dimensions of the seed sensor. Furthermore, the commonly used LED light sources do not provide uniform light in the entire range of their illumination angle, therefore it is possible that within the overall detection chamber of the seed sensor there is no homogenous light. The homogenous light, i.e. the homogenity of the light intensity, within the seed sensor is necessary for properly detecting the seeds of various sizes at various light intensities.

The accuracy of the seed sensors therefore depends on the sensitivity of the sensor which is recommended to be adjusted so that it suits to the type of the seeds for achieving the highest possible accuracy. This object is solved by a seed sensor described in the document WO 2014/035949, in which a plurality of light sources (LEDs) provide homogenous light intensity within the detection chamber. However the intensity of the light sources (LEDs) arranged in the middle and in the periphery of the seed sensor is not uniform because of the light beams reflected from the walls, therefore different light intensity values are used for those light sources which are arranged along the peripheries and for those which are in the middle of the seed sensor. Due to this solution homogenous light can be produced in the seed sensor which allows to properly detect the seeds passing through the seed sensor at any point within the seed sensor. In this solution the light intensity of the light sources is constant. Sensitivity of the seed sensor may be set by adjusting the output amplification of the receiver (photovoltaic sensor). In this circuit the sensitivity can be adjusted to a few levels. The detection process of the sensor is assisted by an optical unit arranged on the receiver side, wherein the light beams of the transmitters (LEDs) are directed to be parallel by using Fresnel-lens, whereby the interference between them is reduced and the seeds arriving at the same time in parallel can be distinguished from each other more easily, which allows a more precise seed detection.

The way of seeding of a pneumatic grain seeding machine substantially differs from the uniform dispensing of the seeds carried out by a seed planter (wherein the seeds are planted individually). The pneumatic grain seeding machines do not dispense the seeds individually, one-by-one. One of the reasons for it is that in case of less invasive plant cultures (e.g. wheat) it is not so important to keep an exact distance between the plants as it is required for the invasive plant cultures (e.g. maize) seeded by seed planters. That is why the seeds in a pneumatic grain seeding machine move across the seed sensors at a higher speed and non-uniformly, therefore the seeds often move through the detection chamber close to each other in parallel, with one masking another one.

Because of the above described features of the pneumatic grain seeding, the seed sensors used in these machines can only detect the "seeding" or "not seeding" state of the seed conveying pipes of the seeding machine, while they are not capable of counting the number of seeds passing through the seed sensor. The most common method of detecting the "seeding" or "not seeding" state is that in case the detected number of seeds passing through a seed conveying pipe decreases below the lowest expected frequency value (e.g. measured in the number of seeds per second), then the seed sensor indicates a "not seeding" state. Besides the "not seeding" state, the known seed sensors are also capable of determining the blockage of a seed conveying pipe since according to the experiences, when the expected number of seeds per second decreases at least to its half value in a seed conveying pipe, it is caused by the blockage of the seed conveying pipe at high probability. These seed sensors, however, are capable of detecting the expected number of seeds only after a calibration procedure in which the number of signals generated by the detectable seeds is counted and the expected number of seeds is then determined. The inaccuracy of the seed sensors of the known pneumatic grain seeding machines depends on the amount of seeds dispensed by the machine, whereas the dispensed amount of seeds depends on the speed of the machine. With dispensing at higher intensity, when the seeds pass through the sensors at a relatively high speed and with a non-uniform spatial and temporal distribution, the known seed sensors are not able to determine the exact number of the seeds, i.e. they detect the passage of less seeds than the real number thereof, therefore the detection of blockage of a seed conveying pipe may be missed in many cases. A further problem is that the dispensing of the pneumatic seeding machines may also vary row by row, and in case of seeding with a variable output rate, the dispensed amount of the seeds may also change area by area, therefore the maximum of the dispensing rate of seeds should also be adjusted so that blockage can be detected.

SUMMARY OF THE INVENTION

It is an object of the present invention to eliminate the above problems and to provide a seed sensor for pneumatic seeding machines which allows the more accurate counting of the seeds passing therethrough and the more reliable detection of blockage of a seed conveying pipe.

A further object of the present invention is to provide a method by means of which the blockage of a seed conveying pipe can be detected at a higher reliability than before.

The above objects are achieved by providing a seed counting sensor for pneumatic seeding machines, said sensor comprising:
  a detection chamber within a house, said detection chamber allowing the seeds to pass through the sensor and having a center axis extending in the flow direction of the seeds;
  a plurality of light sources arranged within the house, outside the detection chamber, at predetermined distances from each other, said light sources being in a plane extending substantially perpendicularly to said center axis of the sensor,
  a plurality of light detectors arranged within the house, outside the detection chamber at predetermined distances from each other, said light detectors being in the same plane as the light sources, wherein the number of the light detectors equals to the number of the light sources, and
  a signal processing unit for controlling operation of the light sources and for processing the electronic signals produced by the light detectors,
  wherein the sensor further comprises optical masks arranged in front of the light sources and the light detectors, respectively, and made of a non-transparent material, said optical masks having a plurality of parallel channels opening into the detection chamber, wherein the number of the channels equals to at least the number of light sources or the light detectors, wherein the channels have smaller diameter than that of the optical lenses of the light sources and the light detectors, and wherein the optical lenses of the light sources and the light detectors closely fit to the outer ends of the channels,
  wherein the light sources are separated from each other by non-transparent partitions,
  wherein the minimum length of the channels is dimensioned so that substantially the entire amount of the incident light received by a light detector is emitted by a light source arranged directly opposite thereto, and
  wherein said light sources and said light detectors are arranged in said plane so that they are capable of scanning substantially the entire cross section of said detection chamber.

Preferably, the light sources are LEDs and the light detectors are photodetectors. The LEDs and the photodetectors may operate in the infrared range.

It is preferred that the optical masks are made of rubber or plastic.

The seed counting sensor may further comprise a control circuit for regulating the light intensity of the light sources as a function of the light intensity detected by the light detectors.

The above object are further achieved by providing a method of detecting blockage of a seed conveying pipe of a seeding machine having a central processing unit, the method comprising the step of
  providing a seeding machine with a plurality of seed counting sensors according to the present invention,
  the method further comprising the following steps:
    during a seeding period, continuously measuring the electronic signal lengths of the seeds by means of said seed counting sensors, the seed signal length being defined as an electronic impulse the width of which is proportional to the time period during which a moving seed blocks the incident light of a light detector of a seed counting sensor, and at predetermined intervals the following steps are carried out:

a) in each seed counting sensor, determining an average seed signal length for the given period by means of the signal processing unit of the seed counting sensor, b) forwarding said average seed signal lengths from the signal processing units of the seed counting sensors to the central processing unit of the seeding machine, c) at the central processing unit, determining the median of the average signal lengths over all of the seed counting sensors for the given period, thereby producing a common reference signal length for all seed counting sensors with respect to the given period, d) obtaining an upper limit signal length greater than the reference signal length by multiplying the reference signal length with a sensitivity factor having a value greater than 1, and for each seed counting sensor, the following steps are carried out at the central processing unit of the seeding machine:

determining if the seed counting sensor is in a blocked state, and if the seed counting sensor is in a blocked state, then if the average signal length is greater than the previously stored upper limit signal length, the blocked state is maintained and the previously stored upper limit value will be used as the upper limit signal length in the given period, otherwise the state of the seed counting sensor is changed to a non-blocked state and the currently determined upper limit signal length and its corresponding reference signal length is stored, if the seed counting sensor is in a non-blocked state, then if the average signal length is greater than the currently obtained upper limit signal length, the state of the seed sensor is changed to blocked state, otherwise the non-blocked state of the seed sensor is maintained and the currently determined upper limit signal length and its corresponding reference signal length is stored.

BRIEF DESCRIPTION OF THE DRAWINGS

FIG. 3 illustrates a dispensing head of a pneumatic grain seeding machine in top plan view and in side view, FIG. 7a is a side sectional view of the internal design of the seed sensor according to the invention, FIG. 7b is a front view of the internal arrangement of the seed sensor according to the invention, FIG. 7c illustrates the internal arrangement of the seed sensor according to the invention in a top sectional view.

DETAILED DESCRIPTION OF THE INVENTION

Figure 1:
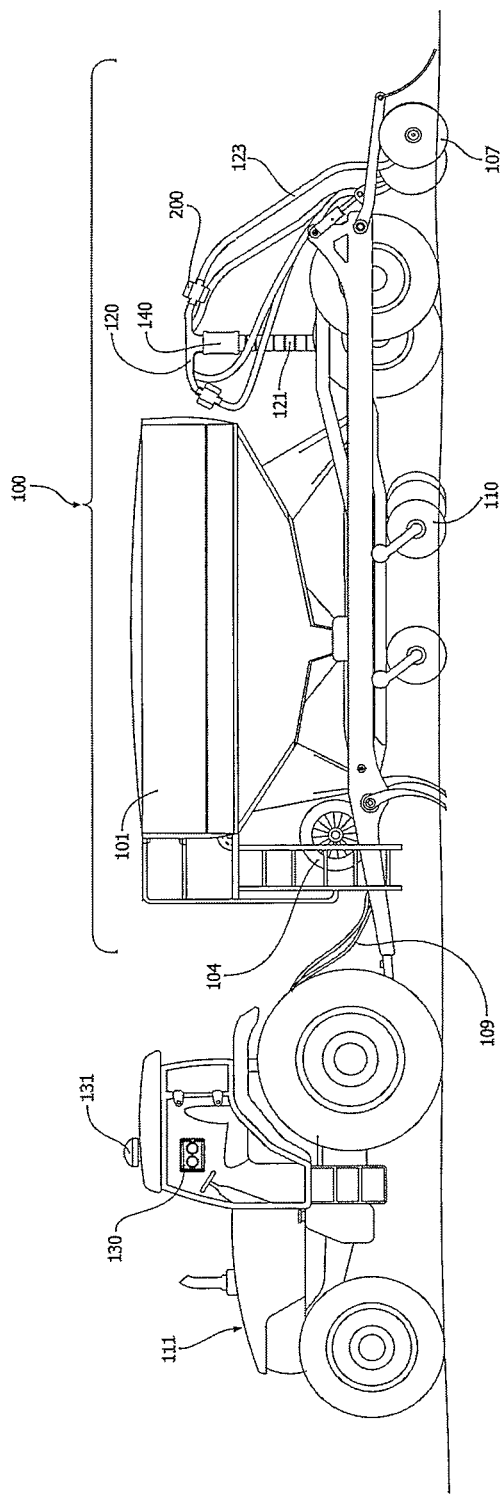
FIG. 1 is a schematic side view of a pneumatic grain seeding machine and a traction engine which is trailing it.
Figure 2:
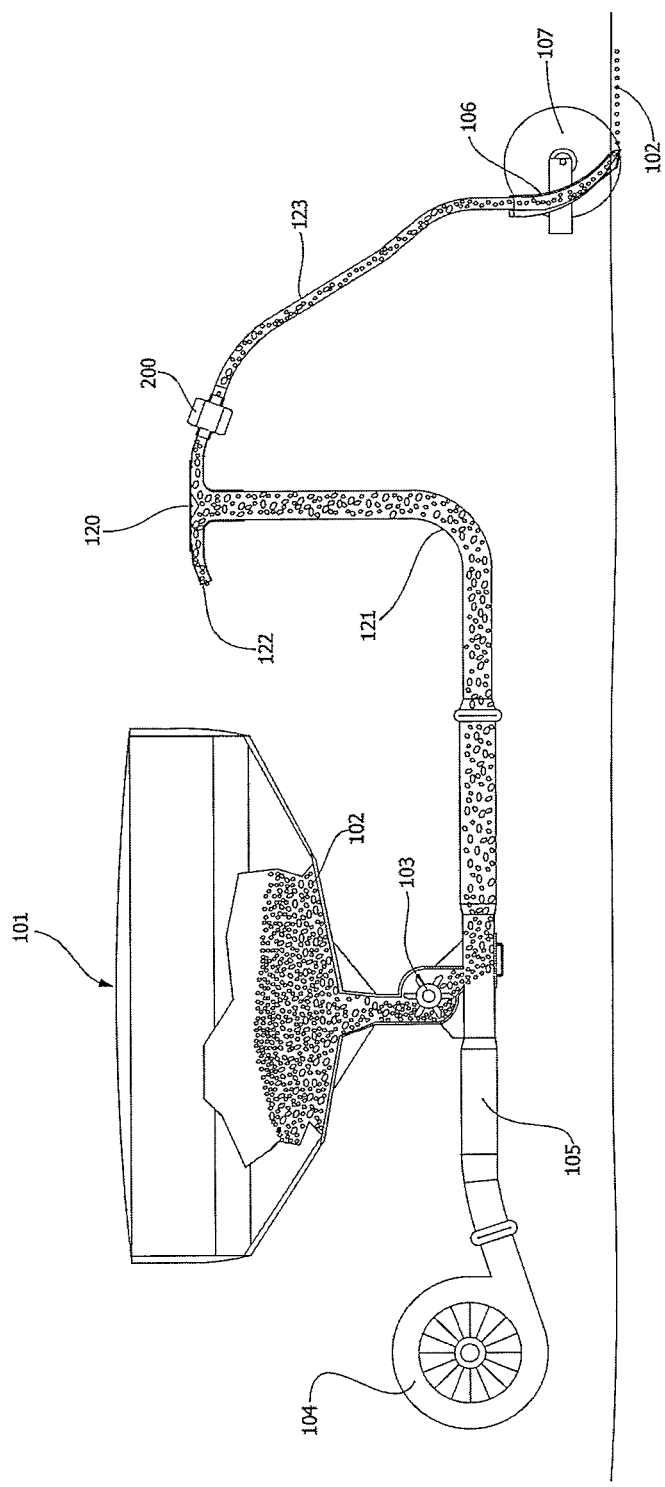
FIG. 2 illustrates the path of the seeds in a pneumatic grain seeding machine partly in a side view and partly in a longitudinal sectional view.
Figure 5:
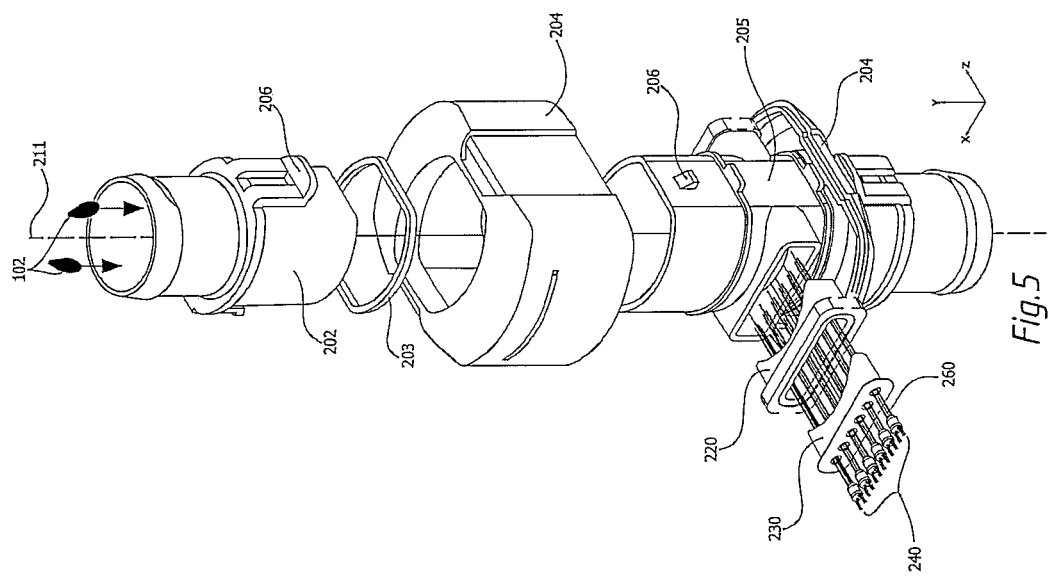
FIG. 5 is a perspective exploded view of a seed sensor according to the invention.
Figure 4:
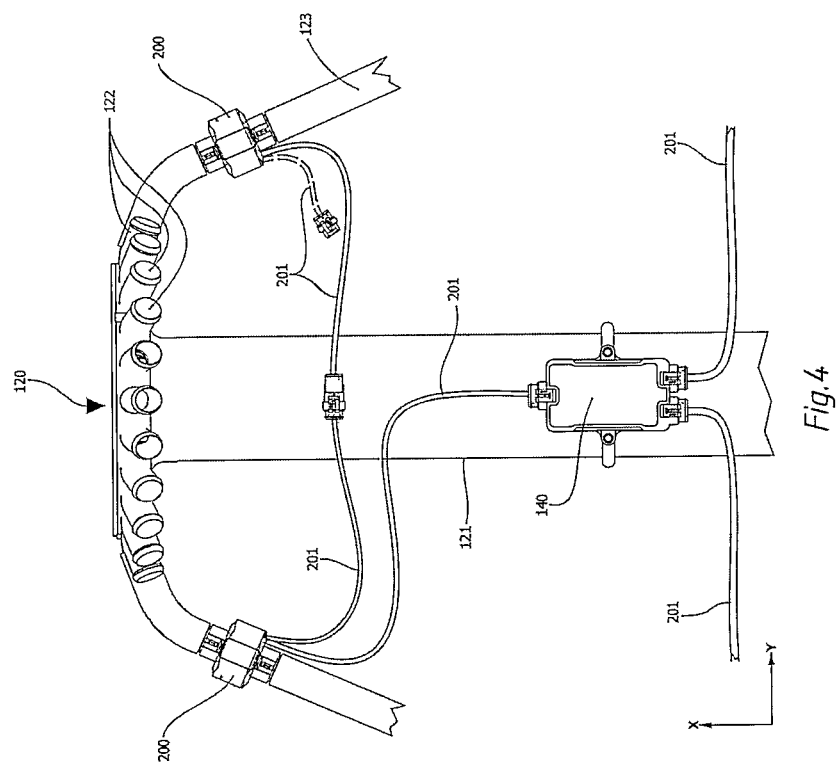
FIG. 4 shows further details of the dispensing head of a pneumatic grain seeding machine.
Figure 6:
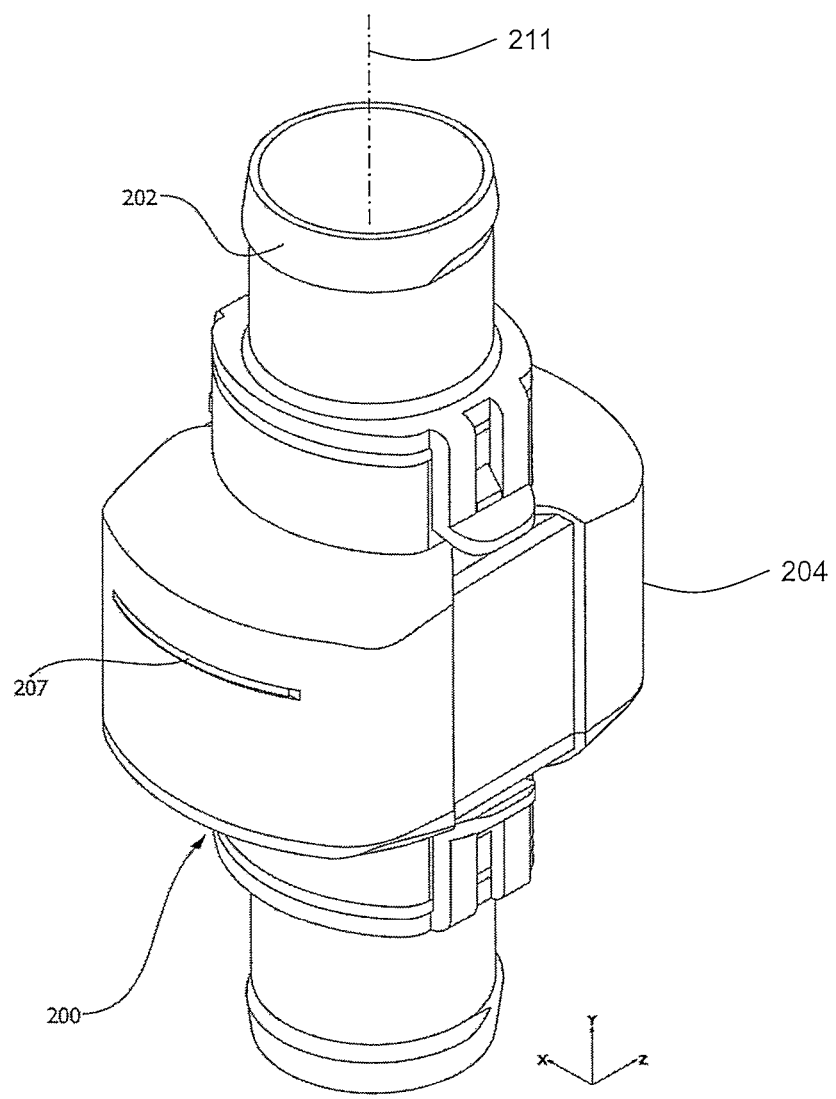
FIG. 6 is a perspective view of the seed sensor according to the invention in a fully assembled state.
Figure 8D:
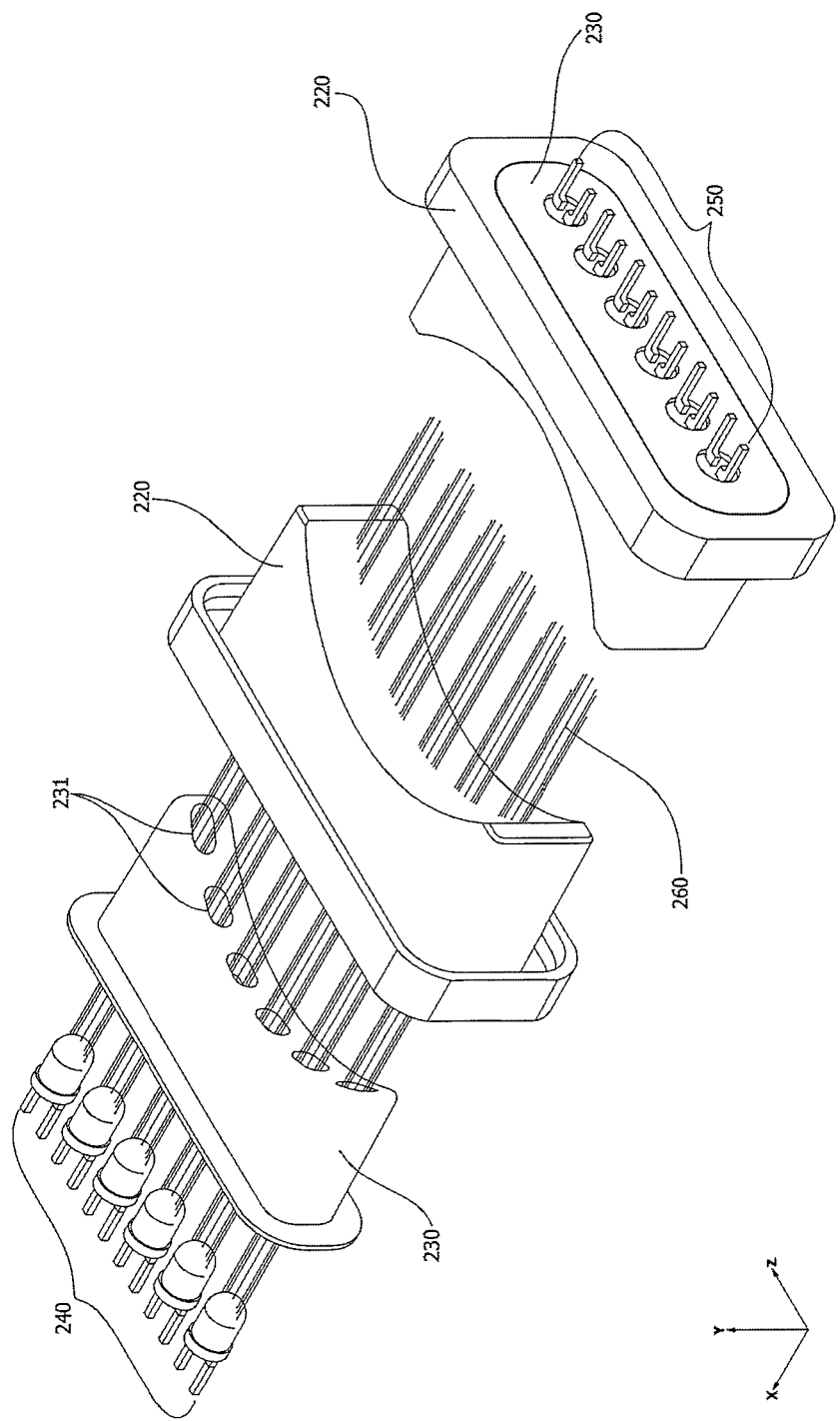
FIG. 8a is a side view of the optical unit of the seed sensor according to the invention.
FIG. 8b is a top view of the optical unit of the seed sensor according to the invention.
FIG. 8c illustrates the optical unit of the seed sensor according to the invention in a top view along the plain A:A of FIG. 8a, FIG. 8d is a perspective exploded view of the optical unit of the seed sensor according to the invention.

In FIGS. 1 to 4 a pneumatic seeding machine 100 and its parts are schematically illustrated in different views. The pneumatic seeding machine 100 is trailed by an appropriate traction means, such as a traction engine 111. A seeding control and supervising unit 130 of the pneumatic seeding machine 100 is mounted on the traction engine 111, wherein a GPS positioning device 131 is connected to said unit 130, the GPS positioning device 131 being necessary for the spatial control of dispensing the desired amount of the seeds. Generally, the pneumatic seeding machines 100 have no own electric power supply and hydraulic drive, therefore those units are connected to the traction engine 111 via electrical and hydraulic lines 109. The pneumatic seeding machines 100 have at least one seed container 101. The seeds 102 are conveyed from said seed container 101 through a feeding system into an air pipe 105 connected to a ventilator 104, wherein the seeds are conveyed from said air pipe 105 to at least one dispensing head 120 through at least one central pipe 121. The uniform air stream responsible for conveying the seeds 102 is provided by the ventilator 104. In the seed conveying pipes of the pneumatic seeding machine 100 the uniform dispensing of the seeds is provided by the dispensing head 120, to the output 122 of which are connected the seed conveying pipes 123. These seed conveying pipes 123 transport the seeds 102 to the coulter 106 at the end of the seed conveying pipe. Adjacent to the coulter 106 a plurality of furrower discs 107 are arranged for making seed furrows in the soil that has been already fitted by land fitting discs 110. The coulter 106 functions to place the seeds 102 into seed furrows of the soil. In general, the dispensing system 103 is electrically controlled by a seeding control and supervising unit 130 which controls the amount of seeds to be dispensed proportionally to the speed or according to the GPS positioning device 131.

The seed counting sensors 200 are interposed in the seed conveying pipes 123, close to the dispensing head 120. By using a seed sensor 200 adapted for seed counting, the number of dispensed seeds 102 can be counted on a row basis during seeding. To accommodate the seed sensors 200 in the pneumatic seeding machines 100 is a common practice as the sensors are subject to physical injury to the least extent at those places. In the seed conveying pipes 123 of the pneumatic seeding machines 100, when high dose dispensing takes place the seeds 102 move adjacent to each other, in most cases with contacting each other.

FIGS. 5 to 8 illustrate the seed sensor according to the invention and its various parts in different views in a preferred embodiment of the sensor. The seed sensor 200 comprises a detection chamber 210 allowing the seeds to pass therethrough, said detection chamber 210 having a center axis 211 extending substantially in the same direction as the flow direction of the seeds. Within the house 204 but outside the detection chamber 210, a plurality of light sources 240 are arranged in a plane P extending substantially perpendicularly to said center axis 211 of the detection chamber 210. The light sources 240 are arranged equidistally at predetermined distances from each other. Also within the house 204 but outside the detection chamber 210, opposite to the light sources 240, a plurality of light detectors 250 are arranged within the same plane P as the light sources 240. The light detectors are also arranged equidistally, at predetermined distances from each other. The number of the light detectors 250 equals to the number of the light sources 240. The seed sensor 200 further comprises a signal processing unit 502 (FIG. 7b) for controlling the operation of the light sources 240 and for processing the signals of the light detectors 250. The light sources 240 and the light detectors 250 are arranged in said common plane P so that they are capable of scanning substantially the entire cross-section of said detection chamber 210, said cross-section being substantially perpendicular to the flow direction of the seeds.

A novel feature of the seed counting sensor 200 according to the invention is that the interference between the light detectors 250, which has an adverse effect to the detection of seeds 102 moving in parallel and closely to each other, is reduced by that the illumination angle of the light beams 263 of the light sources 240 and the angle of aspect of the light detectors are reduced by means of optical masks 230. The optical masks 230 are a non-transparent units arranged in front of the light sources 240 and the light detectors 250, respectively, and containing parallel channels 231. The diameter of the channels 231 opening into the detection chamber is smaller than that of the optical lenses 241 and 251 of the light sources 240 and the light detectors 250, respectively, arranged in front of the channels 231. The optical lenses 241, 251 are embedded in the optical masks 230 and tightly fit to the external end of the channels 231. The number of channels 231 formed in the optical masks 230 is the same for the light sources 240 and the light detectors 250, with the limitation that within the optical masks 230, the channels 231 are separated by a partition made of a material which is non-transparent for the light of the light sources 241. The partitions are preferably made of a black material. The minimum length of the channels 231 is dimensioned so that substantially the entire amount of the incident light received by a light detector 250 is emitted by a light source 240 arranged directly opposite thereto.

In the seed sensor 200 according to the invention, the adjacent light sources 240 and the adjacent light detectors 250 are arranged at a predetermined distance from each other so that the detection chamber 210 is substantially free of blind area with respect to the seed detection.

As shown in FIG. 7a, the necessary electronic modules of the seed sensor 200, including a receiver circuitry 501, an illumination controller circuitry 301, a power supply 304 and a signal processing unit 502, are all arranged in a plastic house 204 that protects the electronic components from water, dust and sunshine during the outdoor use. Within the house 204 there is a holding element 205 for the optical components, said holding element 205 being a plastic piece defining the detection zone. This holding element 205 holds the optical components needed for detection, including the light sources 240, the light detectors 250 and the optical mask 230, and also windows 220 for protecting the aforementioned components, said windows 220 being preferably made of a transparent material. For attaching the seed sensor to the associated seed conveying pipes 123, a cam is formed on the holding element 205 and engaged with releasable dents 206 formed on the pipe adapters 202, which can be inserted into the seed sensor 200 on both of its upstream and downstream ends. Due to the pipe adapter 202 the seed sensor can be easily cleaned when it has become dusted, while the replaceability of the pipe adapter 202 also allows to connect the seed sensor to seed conveying pipes 123 of different size. The air-tight connection between the pipe adapters 202 and the holding element 205 is provided by a sealing ring 203 which prevents the pressurized air from regressing from inside the seed sensor 200. The seed sensor 200 is preferably provided with a status indicating LED 207 for fault indication, according to which the user can check the proper operation of the seed sensor on the spot. The status indicating LED 207 may, for example, warn of the dust trouble of the seed sensor 200.

Figure 9:
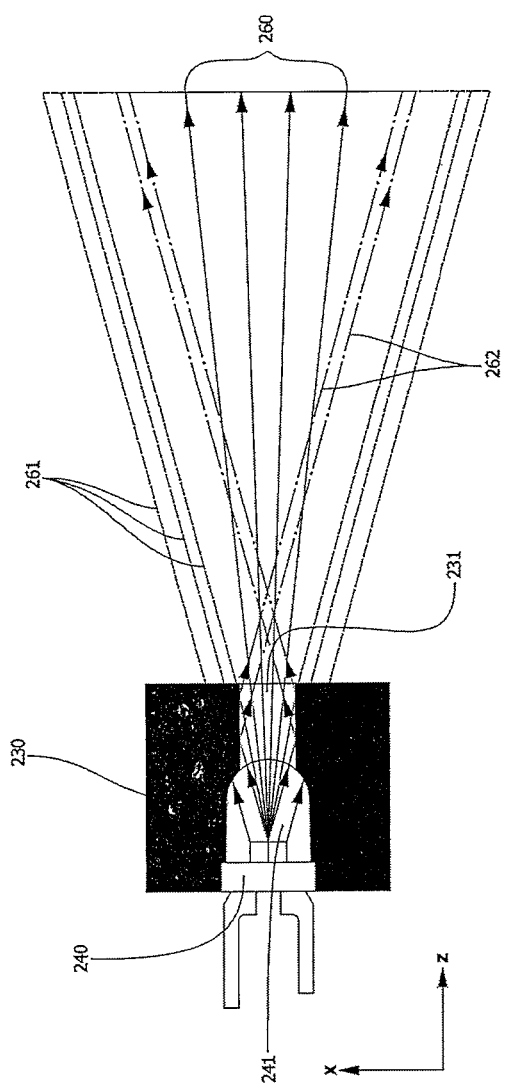
FIG. 9 illustrates the design of the optical mask used in the optical unit of the seed sensor according to the invention, as well as the dispersion of light, in a side sectional view.
Figure 10:
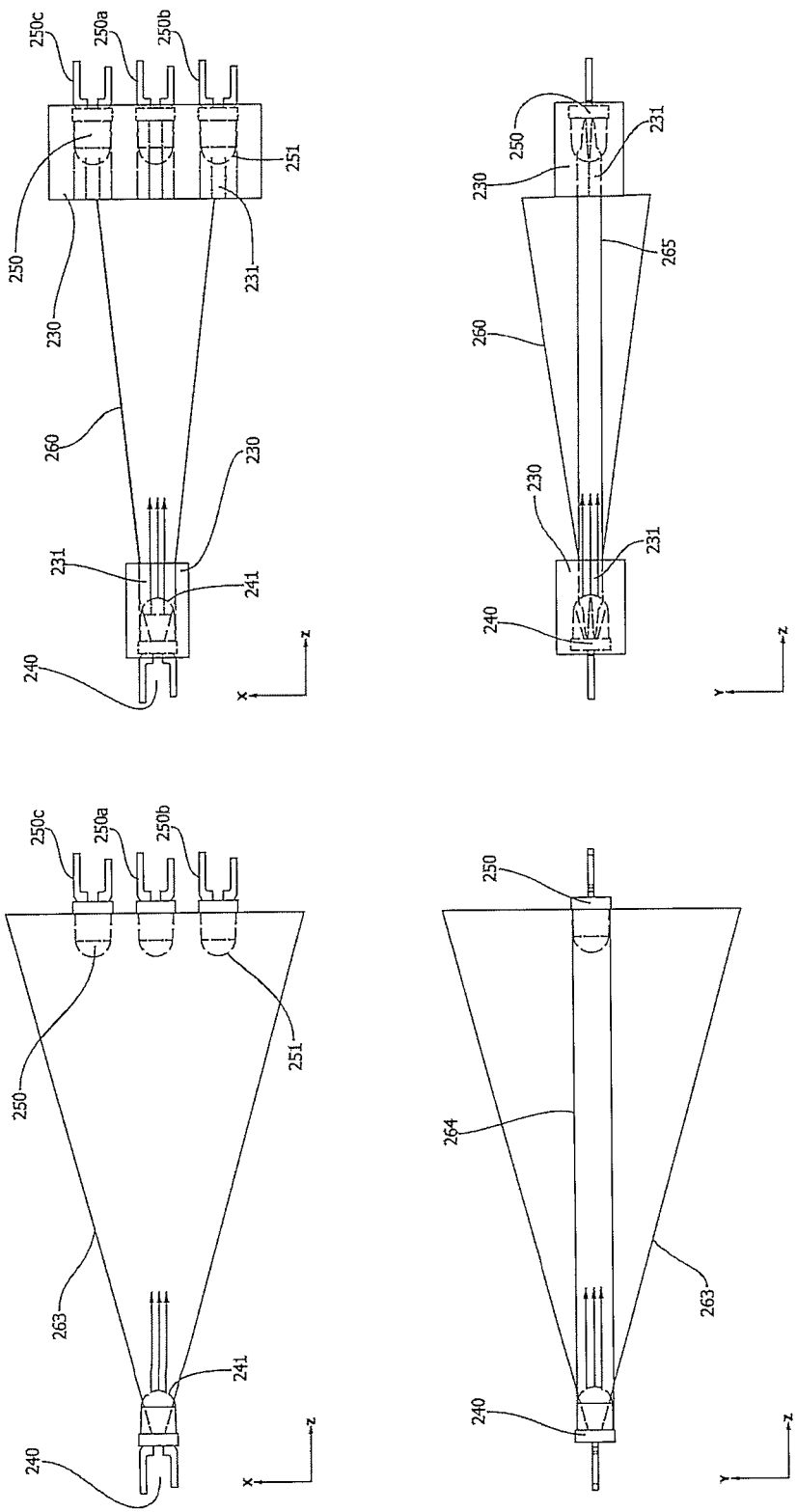
FIG. 10 illustrates the light dispersion when the optical mask of the seed sensor according to the present invention is used and when not used, respectively, in a top view and a side view.
Figure 11:
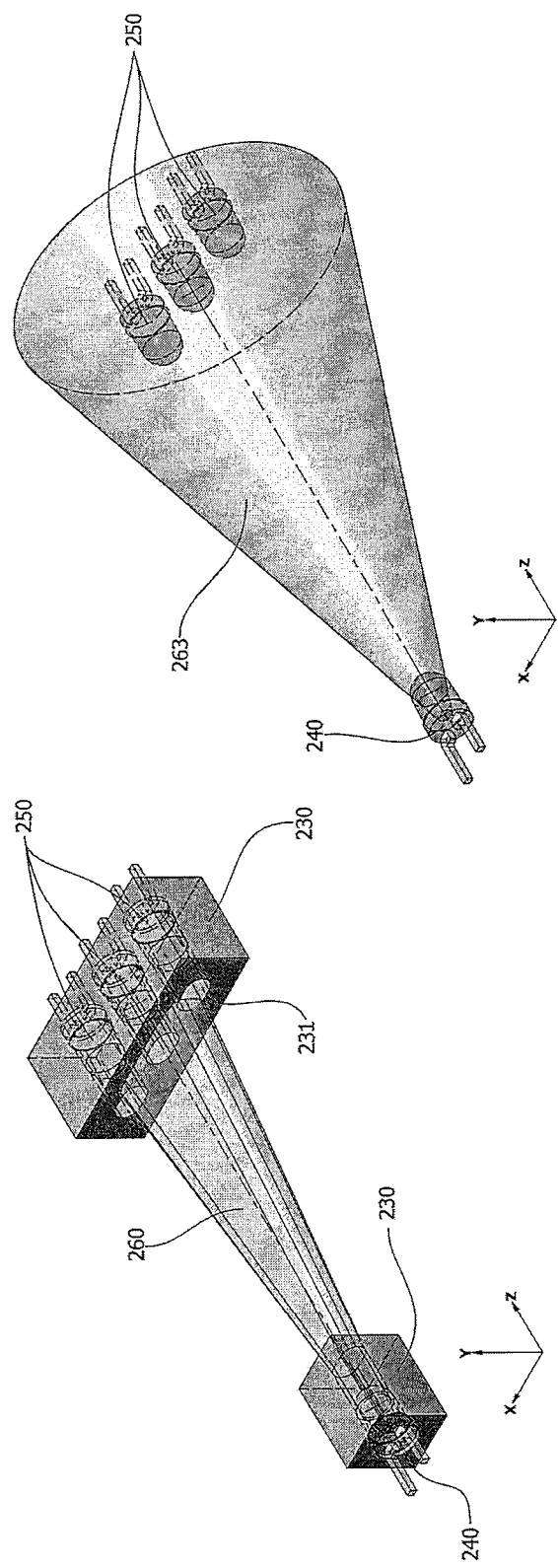
FIG. 11 illustrates the light dispersion when the optical mask of the seed sensor according to the present invention is used and when not used, in a perspective view.

FIGS. 9 to 11 illustrate, in different views, the dispersion of light within the seed sensor according to the invention when an optical mask 230 is used and when no optical mask is used. For the sake of simplicity, in FIGS. 10 and 11 only one light source 240 and three light detectors 250 are shown. These figures clearly show a light beam 260 emitted by the optical lens 241 of the light source 240 through the optical mask 230 and detected by the light detector 250a arranged directly opposite to the light sources 240 and also by its adjacent light detectors 250b, 250c (FIG. 10). FIG. 10 also illustrates that in case of using the optical mask 230, the detection zone 265 of the light detectors 255a to 255c is narrower than that of the detection zone 264 produced without using an optical mask. Due to the narrower detection zone 265 the interference between the adjacent light detectors 250a-250c is substantially decreased and practically, it is eliminated.

During operation, the optical masks 230 allows to reduce the interference between the light sources 240 and the light detectors 250 arranged opposite to each other within the housing 204 as due to the limited space of the channel 231, this channel 231 does not allow a portion of the light beam 263 emitted by the optical lens 241 of a light source 240 to pass through the optical mask 230, whereas a portion of the light beam 263 entering the channel 231 is reflected from the inner wall of the channel 231 and after the reflection the intensity of these light beams declines, therefore a negligible amount of light is received by the light detectors adjacent to the light detector arranged directly opposite to a particular light source 240. It means that only the light beam 260, i.e. a portion of the originally emitted light beam 263 that is made narrow by the optical mask 230, reaches the light detectors 250. Furthermore, the optical mask 230 also reduces the aspect angle of the light detectors 250 as the channels 230 provide a narrower aspect angle (a so called "tunnel vision") also for the light detectors 250.

Figure 12:
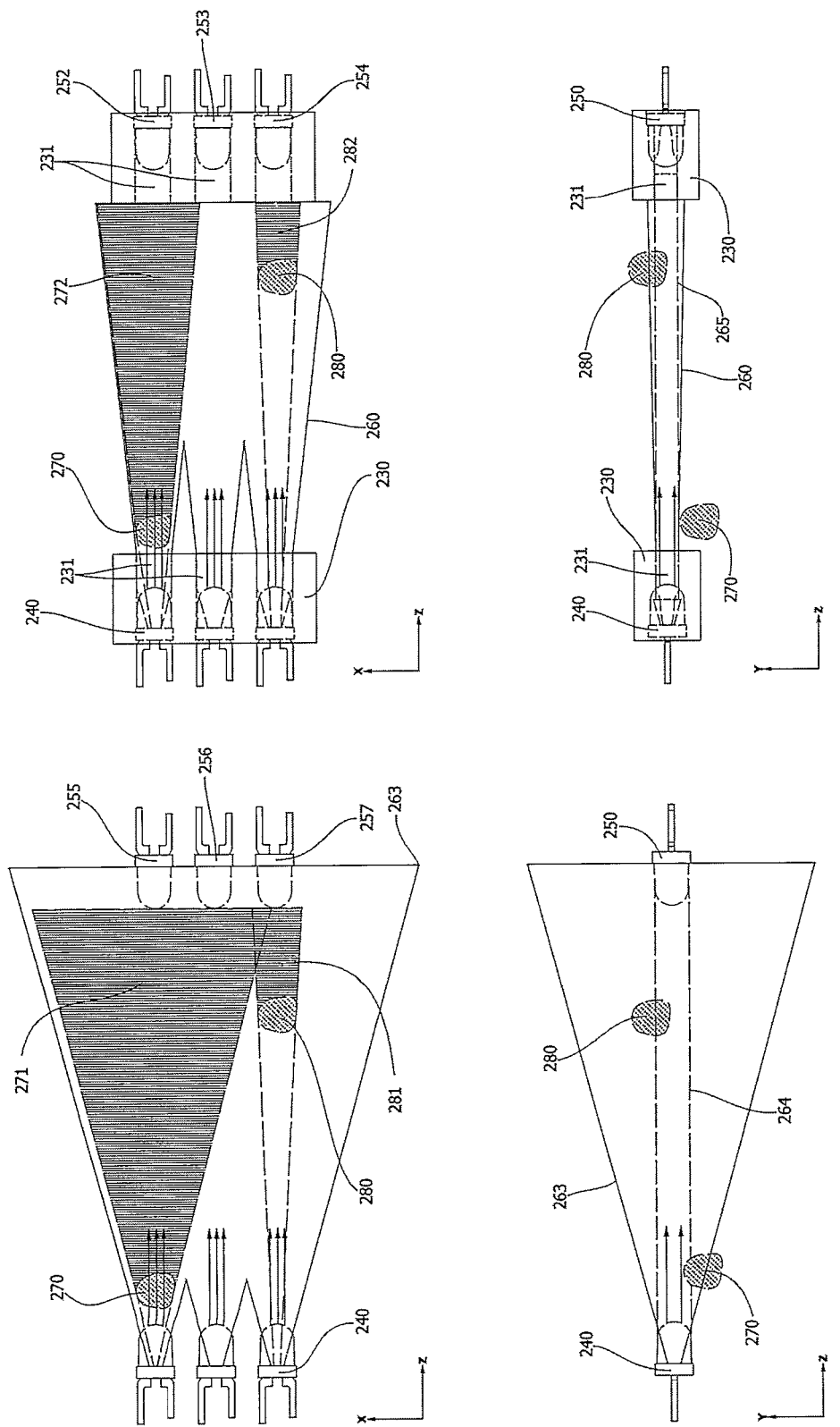
FIG. 12 illustrates the shadow projected by the seeds when the optical mask of the seed sensor according to the present invention is used and when not used, in a top view and side view.

The operation of the seed sensors according to the invention is clearly explained by the embodiment shown in FIG. 12, wherein a seed moving close to one of the light sources 240 and a seed 280 moving close to one of the light detectors 254 are shown. The shadow 272 of the seed 270 moving in front of the light source 240 is substantially projected only to the light detector 252, while the shadow 282 of the seed 280 moving in front of the light detector 254 is substantially projected only to the light detector 254. Within the field of vision of the light detector 253, no shadow is practically produced. The number of shadows is 2, the number of seeds is 2, therefore the number of seeds can be exactly determined from the number of the shadows.

In contrast, if the same situation is examined without the use of the optical mask 233, then it is experienced that the shadow 271 of the seed 270 moving before the light source 240 is projected to the light detector 255, which is right opposite to the seed 270, as well as to the adjacent light detector 256 and partly to the further light detector 257. However, the shadow 281 of the seed 280 moving before the detector 257, is projected only to the light detector 257, meaning that a common shadow is projected to the three light detectors 255-257. In this case the number of shadows is 1, the number of seeds is 2, therefore from a single wide shadow, the number of the seeds cannot be determined exactly.

As illustrated in FIG. 12, if no optical mask 230 was used, then in case when one seed 280 would follow the other seed 270 at a small distance, then the shadow of the firstly travelling seed 270 would generate a signal in each of the three light detectors 255-257, the next seed 280 would not generate a further signal at entering the evaluation zone 264 in front of the light detectors 255-257, therefore the shadows of the two seeds 270, 280 would not be separated, meaning that the number of the seeds could not be unambiguously determined from the number of the shadows. However, by using the optical mask 230 in the seed sensor 200 according to the invention, if one seed 280 and another seed 270 arrive with a small distance between them, the firstly arriving seed 270 will not produce a shadow on the light detector 250 after it has left the restricted regulation zone 265, thus the following seed 280, which arrives later, will generate a new signal in the light detector 250, therefore the shadows of the two seeds will be separated from each other and thus the number of seeds passing through the seed sensor 200 can be exactly determined from the number of the shadows. According to the invention, those signals generated for the receiver circuits 501 by the seeds moving in parallel one after the other with a small distance between them can be separated from each other in a more definite way.

Figure 13:
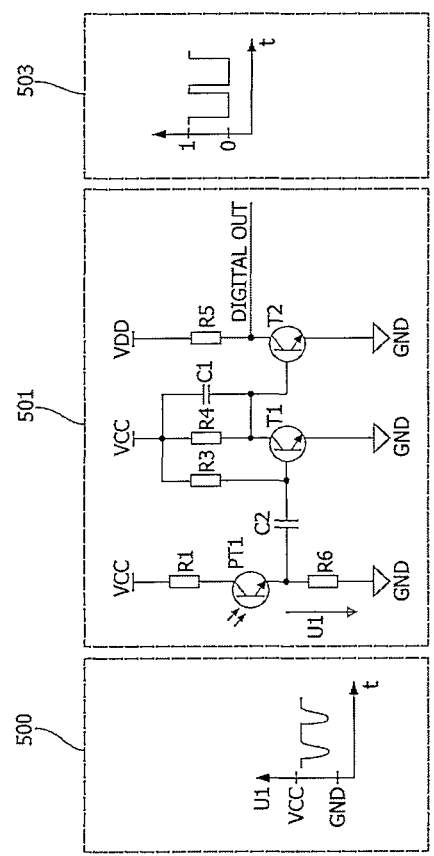
FIG. 13 is a circuit diagram of the receiver used in the seed sensor according to the invention.
Figure 14:
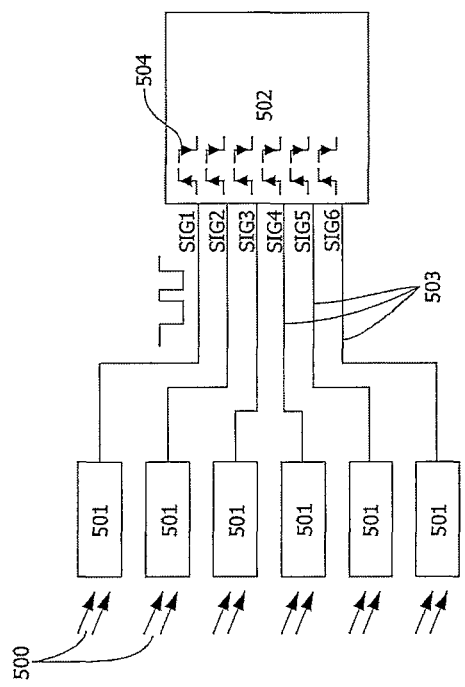
FIG. 14 is the functional block diagram of the optical receiver of the seed sensor according to the invention.

An exemplary circuit connectivity diagram of a preferred embodiment of the receiver circuit used in the seed sensor according to the invention is shown in FIG. 13 and the functional block diagram of the optical receiver of the seed sensor according to the invention is illustrated in FIG. 14. The receiver circuit 501 is connected to the a signal processing unit 502 through multiple input channels, wherein the algorithms of the signal processing logic for the determination of the seed number is applied by a software running in the signal processing unit 503, such as a microcontroller.

During operation the receiver circuit 501 functions to convert the light signals 500 detected by the light detectors 251 into analogue electrical signals, said light signals corresponding to the changes in the light intensity as a result of the shadows of the seeds, for example the shadows of the seeds 270 and 280 shown in FIG. 12, and then to amplify the electrical signals and to convert them into digital signals 503. Conversion of the light stream into electrical signal is carried out by a phototransistor PT1, which outputs current intensity proportionally to the intensity of the incident light. The current intensity of the phototransistor PT1 is typically in the range of $\mu A$. A resistor R6 connected in series with the phototransistor PT1 converts the analogue current signal into an analogue voltage signal and further amplifies that signal to the range of mV. The time diagram 500 depicts the changes of the voltage U1 measured on the resistor R6 when the seeds pass through the seed sensor. As it can be seen from the diagram, the voltage level at the operating point resulted from the light current at the operating point temporarily decreases because of the shading effect of the seeds. The analogue signal U1 is connected to the input of a digitizing circuit by AC coupling through a capacitor C2. The significance of this solution is that the trigger level is independent of the voltage U1 at the operating point. By controlling the base voltage of the transistor T1 even a voltage drop of a few mV can result in triggering at the digital output of the receiver circuit 501. Thus a substantially sensitive seed detection can be achieved which allows even the detection of very small seeds moving at high speed. It the embodiment of the seed sensor according to the invention shown in FIG. 8b, the seed sensor 200 comprises six pairs of light sources and light detectors, wherein the signals of each of the six light detectors (e.g. phototransistors) has its dedicated receiver circuit 501. Thus the entire detection zone of the seed sensor 200 is divided into six substantially separated detection zones. Each of the light detectors 250 (e.g. phototransistors) provide a digital signal on a digital input channel 503, indicated by SIGn (n=1, 2, 3, . . . ) through its own receiver circuit 501 for the signal processing unit 502. The digital input channels forming the outputs of the receiver circuit 501 are connected to the edge-controlled interrupt inputs 504 of the signal processing unit 502 (e.g. microcontroller), wherein said inputs 504 generate an interruption in the respective circuits of the signal processing unit 502 both for the leading edges and the trailing edges. This solution has the advantage that there is no need for continuous polling of the inputs, while a change in the logical state of any one of the inputs can be immediately detected and the status of the inputs or the changes in the status thereof can be saved into a data storage device.

Now the method of detecting blockage of the seed conveying pipes according to the invention will be described. The method according to the invention can be applied in those seeding systems in which the seed sensors are simultaneously used and the seed sensors comprise multiple light sources and multiple light detectors arranged opposite to the light sources in a way that each of the light detectors substantially detects the light of only one light source arranged right opposite thereto. In these sensors the detection chamber is free of dead space. Moreover, a dedicated seed sensor is associated with each seed conveying pipe. As it was described in detail above, the seed sensors according to the present invention allow accurate determination of the number of seeds, which is a key point for the appropriate operation of the method of the invention.

Figure 15:
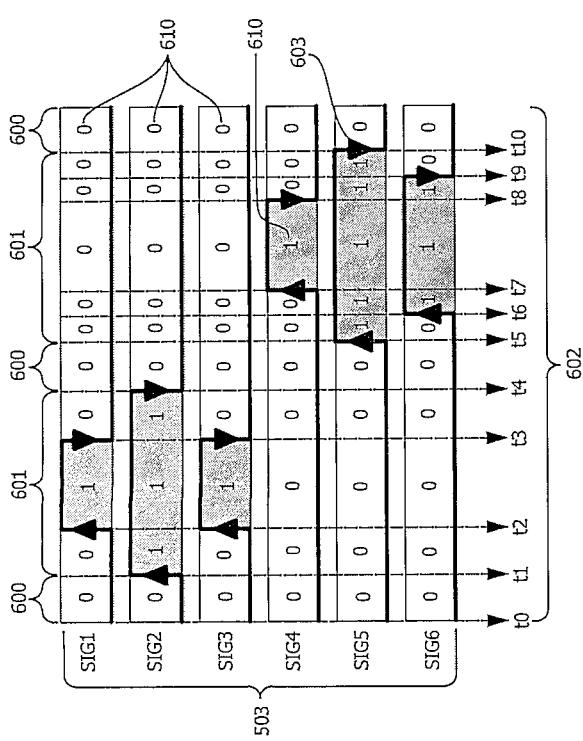
FIG. 15 illustrates time diagrams showing exemplary signals produced by the seed sensor according to the invention and their sampling.

The concept of the signal processing method according to the invention will now be explained with reference to FIG. 15 in which the time diagrams of exemplary digital signals 610 generated by seeds moving after each other through the seed sensor 200 are depicted. At the time instant $t_0$, defined as an initial state, there is no signal on any of the digital inputs 503. As can be seen in FIG. 15, every change in the signal 603 (i.e. leading edge or trailing edge) generates an interruption at the signal processing unit 102, followed by a sampling operation. The actual state (0 or 1) of the digital input channels 503 can also be identified at the sampling times 602. The first step of processing of the digital signals SIG1-SIG6 arriving at the inputs of the signal processing unit 502 is the temporal division of the signal stream into shorter sections, i.e. blocks 601. With one block 601 those signal changes 603 are preferably associated which are in logical relationship with each other. An obvious solution for such association is that the beginning and the end of a block 601 are defined by the inactive state 600 (the logical 0 in FIG. 15) of all of the digital input channels 503. The signal stream shown in FIG. 15 can be divided into two blocks 601, the first block 601 including all of the signal changes 603 within the period $[t_1,t_4]$, whereas the second block 601 includes the signal changes 603 within the period $[t_5,t_{10}]$. The two blocks 601 are separated by an inactive time interval 600 defined by the period $[t_4,t_5]$. As digital signals are here used, the information content of the signals of the digital input channels 503 is provided by the new states after the signal changes 603 (leading or trailing edges) on the one hand, and the time of the signal changes 603, on the other hand. Accordingly, the data stored by the signal processing unit 502 comprise the logical states of the digital input channels 503 represented by binary numbers consisting of bits, and relative time stamps of the signal changes 603. Since signal processing is carried out for each block 601, the time instants of the leading and trailing edges, i.e. the signal changes 603 are stored relatively to the beginning of the given block 601 in order to make the computations easier and to save memory. In the signal processing according to the invention, when the seeds move through the seed sensor one after the other, i.e. when one of the seeds has already crossed the light beam 260 before another seed arrives to this light beam 260 (see FIG. 12), the signal changes produced by the seeds are separated in time and in this case the different seeds can be easily identified.

Figure 18:
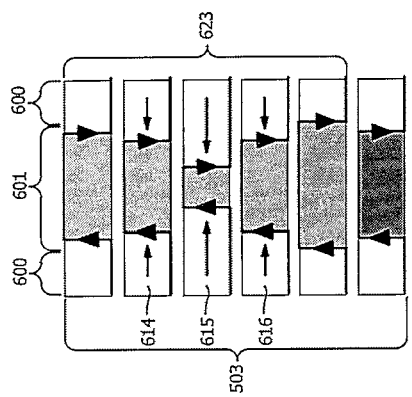
FIGS. 16 to 19 illustrate time diagrams showing exemplary signals produced by the seed sensor according to the invention and their sampling in different detection situations.
Figure 19:
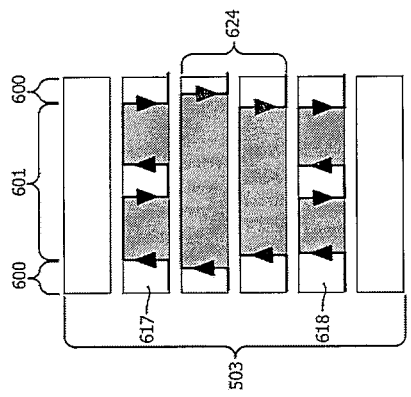
Figure 16:
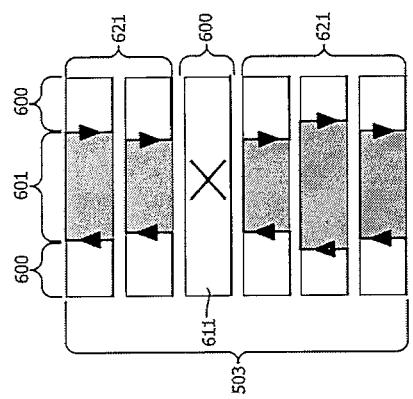
Figure 17:
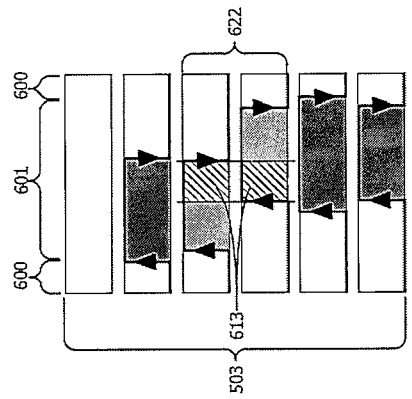

As mentioned above, the signal shapes appearing on the digital input channels 503 may be overlapping. Since the light beams 260 emitted through the optical mask 230 of the light sources 240 are not entirely parallel to each other even with masking, slight interference between the digital input channels 503, which is negligible in most cases, is unavoidable, i.e. a given light source 240 illuminates not only the light detector 250 that is directly opposite to it, but to a certain extent, also to its neighboring light detectors. It is noted that even if the detection space volumes belonging to the outputs of the light detectors 250, which are associated with the digital input channels 503, would be entirely disjoint (i.e. there was no interference at all), the number of seeds simultaneously moving through the sensor couldn't be determined even for a particular type of seed (for a seed of particular size) solely from the number of signal changes 603 appearing on the respective digital input channels 503. The aim of the logical signal processing according to the invention is to examine the signal waves of the channels on a block basis, wherein for determination of the number of seeds staying at the same time within the illumination zone of a given light beam, the following basic cases can be distinguished:

a) The first case is in which based on the signal waves, the block 601 is further divided into two or more regions (spatial separation). The separated regions (or segments) represent different seeds. If necessary, these regions may be further examined independently of the other regions. FIG. 16 illustrates an example of how a block 601 is divided into regions, wherein spatial separation of two regions 621 may be carried out due to the inactive state 600 of the third channel 611.

b) The second case is based on that seeds can be regarded as convex bodies with good approximation. In a practical aspect, when the signals of the digital input channels 503 are examined along time (according to the physical signals of the digital input channels 503), a substantial decrease and then a substantial rise can be recognized in the signals. As shown in the example of FIG. 18, in the channels starting from the channel 611 adjacent to the channel 615 and in the channels starting from the channel 616, an increase in the signal lengths can be observed in the region 623 with respect to the signal length of the channel 615. As convexity of the seeds is not strictly satisfied in all cases, threshold values are specified for the degree of decrease and the degree of subsequent increase of the signal length.

c) In the third case there is a substantial time difference between the arrivals of the seeds at the light beam 260 with respect to the signal lengths generated by the different seeds. Consequently, overlapping of the signals of the channels belonging to different seeds and the offset between the different signals can be examined more easily in practice on the basis of the rate of overlapping of the signals in question. This case is clearly illustrated in FIG. 17, wherein, for example, the threshold value is set to 50%, and for an overlapping rate below this threshold value, the signals within the block 601 can be regarded as being generated by different seeds according to the overlapping 613 detected in the region 622 between the two respective channels.

d) In the forth case the signal changes on the channels 601 in each of the blocks also carry useful information. FIG. 19 shows an example for this fourth case, wherein two seeds are moving one after the other practically in contact, which is reflected in the continuous signals of the channels 624. In contrast, on the channels 617 and 618 the signal is down for a while and then it appears again. From the number of the signal changes one can conclude on that at least two seeds have produced signals within the block 601.

The aim of the method according to the invention is to indicate blockage of any seed conveying pipe 123 of the pneumatic seeding machine 100 shown in FIG. 1 within a short time. A blockage generally takes place at the end of a seed conveying pipe in the coulter 106, because at that location soil fragments or other debris can get into the coulter which then may restrict (partial blockage) or even entirely close (full blockage) the path of the air and the seeds 102. In case of partial or full blockage of the seed conveying pipe 123, a considerable decrease in the air speed together with a generally slight decrease in the seed number can be observed, therefore the method according to the present invention, unlike the conventional solutions, detects decrease in the flow rate of the air, instead of decrease of the expected number of seeds, and determines blockage on the basis of this information. The method of determining blockage is based on that in the uniform air stream provided by the ventilator 104 in the seed sensor 200, the speed of the seeds can be regarded constant, said speed being determined by the signal processing unit 502. The signal lengths of a seed is defined as the width of an electronic impulse which is proportional to the time period during which a moving seed blocks the incident light of a light detector The periods in which the seeds are moving through the seed sensor, are calculated by the signal processing unit 502 from the output signals of the light detectors. The output of the seed sensors 200 are then forwarded to and processed by a central processing unit 140 of the seeding machine. The electronic processing unit 140 is connected through a communication cable 201 to the seed sensors 200, which are preferably connected in series. The central processing unit 140 is preferably arranged underneath the dispensing head 120 along the central pipe 121 because for practical reasons, the communication cables 201 of the seed sensors 200 can be led with high safety at that place. In the method according to the invention, for recognizing the fall of the air flow rate, which is a common phenomenon in a blockage situation, the decrease in the signal lengths measured by the signal processing unit 502 has to be examined. It is important to note that a key point of the operation is that the analyzed signal length is generally obtained from the signals produced by the non-overlapping seeds which separately pass through the seed sensor 200, since this kind of sampling has a significant influence to the sensitivity of blockage determination. Therefore the fact of blockage can be established from the change in the average signal length of one seed (referred to as the seed signal length) because the seed signal length changes in an inversely proportional manner with respect to the higher degree of decrease in the air flow rate. The rather significant changes in the seed signal length allow definite recognition of blockage which is insensible to the varying number of seeds dispensed by the pneumatic seeding machine 100. Since after a blockage has occurred, the seed signal lengths start rising immediately, this method has the further advantage that within a very short period (even within a few seconds) the formation or the termination of an obstruction can be established. The recognition of blockage on the basis of the change in the seed signal length has been made adaptive thereby the seeding machine is capable of continuously adopting itself to a highly variable dispensing rate or even to an area-dependent, variable dispensing rate controlled by the GPS positioning device 131. As a result it is enough to set the sensitivity of blockage recognition once, at the beginning of the seeding process. The at least one electronic control unit 140 mounted on each of the dispensing heads collects the data from the seed sensors, thereby allowing to compute and analyze all data belonging to a given dispensing head 120.

The adaptive blockage detection is based on that an adaptive reference signal length is associated to each seed sensor 200, said adaptive reference signal length always approximating the actual average signal length if there is no blockage of any seed conveying pipe, otherwise (i.e. at the detection of blockage) its value remains unchanged. For adjusting the sensitivity of the adaptive blockage detection, a multiplying factor greater than 1 is used. For example, if a blockage is to be indicated only at a substantial deviation from the reference signal length, the value of the sensitivity factor should be increased accordingly. It is important that at the beginning of seeding, i.e. when the seeds start flowing, the initial reference signal length value should be set appropriately, otherwise the blockage of dication will not work with the required reliability.

Figure 20:
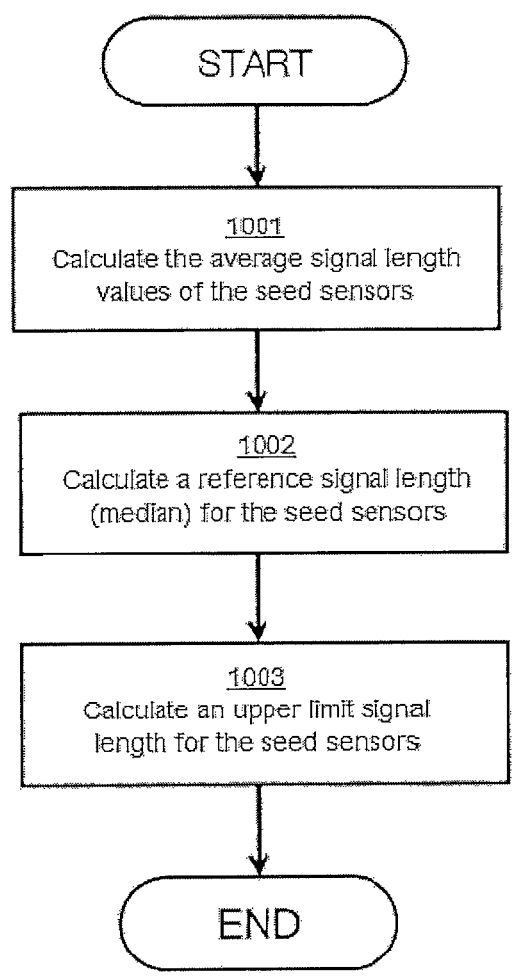
FIG. 20 is a flow diagram showing the major steps of initializing the method according to the invention.

The steps of determination of the initial reference signal length is illustrated in FIG. 20. After starting the seeding process, in step 1001 the average initial signal length is determined for each seed sensor belonging to the same dispensing head, and then in step 1002 the median value of the stored average initial signal lengths is determined for each seed sensor. This median value is then used as a global reference signal length for each seed sensor. In step 1003 an upper limit for the average signal lengths of the seed sensors belonging to the same dispensing head is obtained by multiplying the global reference signal length with a sensitivity factor having a value greater than 1. Steps 1001 to 1003 are carried out for each seed sensor belonging to the same dispensing head.

Figure 21:
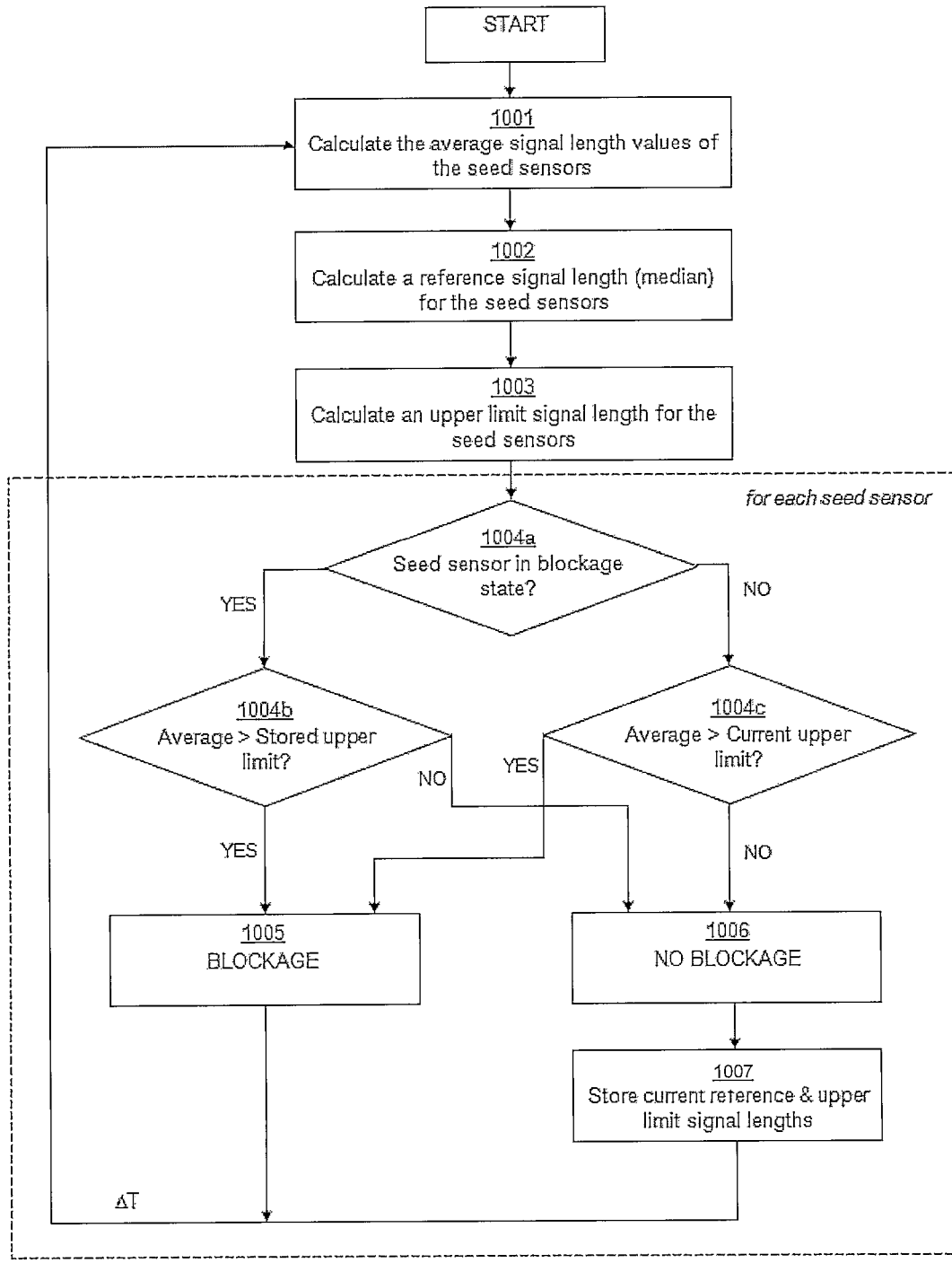
FIG. 21 is a flow diagram showing the major steps of detecting blockage of a seed conveying pipe in the method according to the invention.

When the initial reference signal length is available for each seed sensor, the steps shown in FIG. 21 are carried our repeatedly at predefined time intervals ΔT that define subsequent measuring periods. During this process the step of polling of each seed sensor (i.e. retrieving their average signal length; step 1001), the step of determining the common reference signal length (step 1002) and the step of obtaining the upper limit for the signal length (step 1003) are followed by carrying out the further steps for each seed sensor separately.

In step 1004a it is checked if the seed conveying pipe associated with a given seed sensor is in a blocked state, and if it is so, then in step 1004b it is determined if the average signal length of the particular seed sensor exceeds the stored upper limit. If the seed sensor's average signal length exceeds the stored upper limit determined for the dispensing head, then in step 1005 blockage will be still indicated (i.e. the blocked state of the seed sensor is maintained), otherwise in step 1006 it is indicated that there is no blockage any longer, and in step 1007, the currently determined reference signal length and the corresponding upper limit value will be stored.

If in step 1004a it is determined that in the seed conveying pipe belonging to the seed sensor there is no blockage, then in step 1004c it is determined if the average signal length of the given seed sensor exceeds the currently calculated upper limit value. If the average signal length of the seed sensor exceeds the currently calculated upper limit determined for the dispensing head, then in step 1005, blockage will be indicated (and the state of the seed sensor is changed to blocked state), otherwise in step 1006 it is indicated that there is still no blockage (and the non-blocked state of the seed sensor is maintained), and in step 1007 the currently calculated reference signal length and its corresponding upper limit value will be stored.

Due to storing the currently calculated reference signal length in step 1007 (i.e. by overwriting the reference signal length determined in the preceding period), the value of the reference signal length adaptively approximates the average signal length measured in every measuring period for each seed sensor. In case of detecting a blockage, however, the actually determined common reference signal length and its corresponding upper limit value are not stored, therefore in the next measuring period the previously stored upper limit value will be taken for the comparison of the average signal length of the seed sensors with the upper limit value. Thereby it is guaranteed that in case of blockage of a seed conveying pipe belonging to a given seed sensor, the significantly increased signal length of the given seed sensor does not distort the common (median) reference signal length of all seed sensors belonging to the dispensing head.

Figure 22:
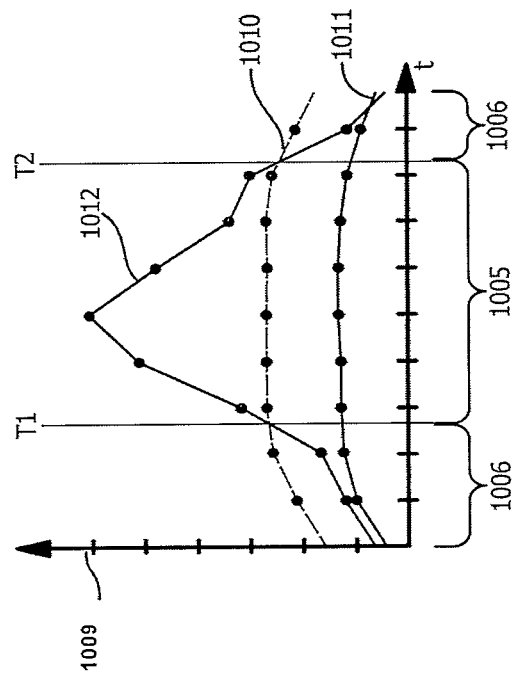
FIG. 22 is a diagram illustrating the examination of blockage of a seed conveying pipe in the method according to the invention.

The use of the method according to the invention is described below with reference to FIG. 22. In the exemplary diagram shown in this figure illustrates different signal lengths associated with a given seed sensor at certain measuring periods. In the diagram the horizontal axis indicates the time (t), and the vertical axis indicates the signal lengths 1009. The reference signal lengths are depicted by the curve 1011, the upper limit signal lengths are depicted by the curve 1010, and the (measured) average lengths of the particular seed sensor are depicted by the curve 1012.

In the diagram it can be seen that at time instant T1 a blockage has been formed as the curve 1012 representing the average signal lengths crosses the curve 1010, meaning that the average signal length exceeds the upper limit value defined by the multiplication of the actual reference signal lengths and the sensitivity factor. The blockage remains till the time instant T2 when the curve 1012 returns below the curve 1010 representing the upper limit signal lengths defined by the multiplication of the reference signal lengths and the sensitivity factor. FIG. 22 also clearly illustrates that when there is no blockage (i.e. before the time instant T1 and after the time instant T2), the reference signal lengths (i.e. the points of the curve 1011) adaptively approximate the average signal lengths of the given sensor (i.e. the points of the curve 1012), whereas within the blockage period between T1 and T2, both of the reference signal lengths (represented by the curve 1011) and the respective upper limit signal lengths (represented by the curve 1010) remain unchanged.

Figure 23:
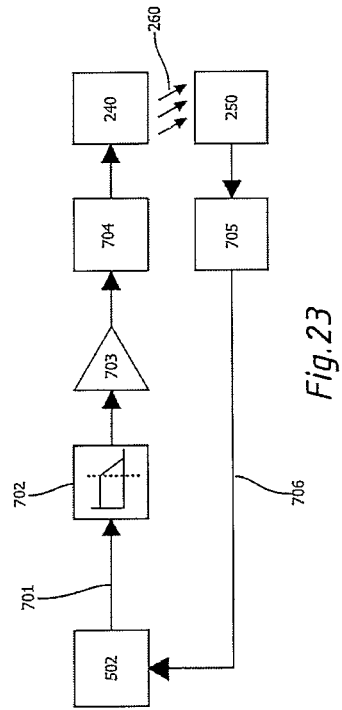
FIG. 23 is a schematic conceptual block diagram of a sensitivity adjustment system used in the seed sensors according to the invention.
Figure 24:
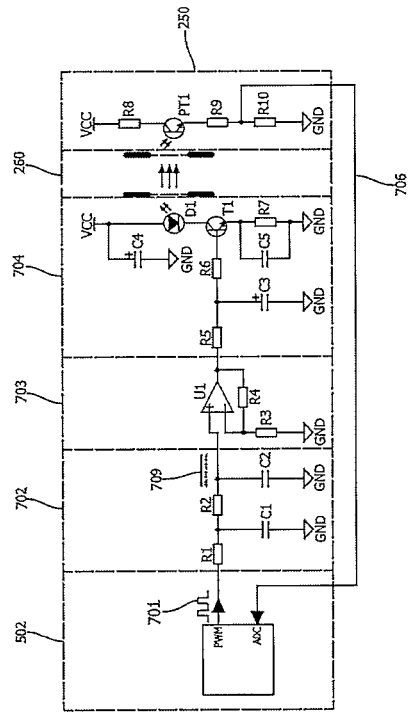
FIG. 24 illustrates the connectivity arrangement of an embodiment of the sensitivity adjustment system used in the seed sensors according to the invention.

For the continuous and proper operation of the seed sensor according to the present invention during use it is essentially necessary to continuously compensate the gradually deteriorative optical properties of the seed sensors, which is caused by the dust and the pelleting agents deposited on the windows protecting the light sources and the light detectors of the seed sensors be. One possible solution for it is that sensitivity of the seed sensors are automatically regulated depending on the given circumstances, and in case of excessive dust trouble an alarm signal is provided to indicate the necessity of cleaning. As shown in FIGS. 23 and 24, in the seed sensor according to the invention, a low pass filter 702 is connected to the PWM output 701 of the signal processing unit 502, to the output of which a driver circuit 704 for controlling the light source 240 is connected. The output current of the light detector 250 (e.g. phototransistor) detecting the light of the light source 240 is fed back to the input of the analogue-digital converter (ADC) of the signal processing unit 502 through a feedback 706 connected to a voltage divider 705.

The above circuit is used to increase the light intensity of the light sources 240 during use in order to compensate the reduced sensitivity. This kind of adaptive light intensity regulation, which can be applied mainly in continuous light emitting seed sensors of optogate type, is suitable for compensating any decrease in the sensitivity resulted from the dust trouble of the seed sensor. The aim of this regulation is to keep the illumination of the light detectors (e.g. phototransistors in the present case), i.e. the light intensity detected by the optical receivers at a desired level. As the output current of the phototransistors is a function of the incident light intensity, the control variable (and also the feedback signal 706 itself) is the current of the phototransistor, which is to be kept at a steady working point. The sensitivity compensation of the seed sensor is performed by a computer program running in the signal processing unit 502. As shown in FIG. 24, the command signal generated by the signal processing unit 502 is a pulse width modulated (PWM) signal 701 having a constant frequency, which signal allows to modify the light intensity by small steps within a wide range by adjusting the duty factor. Next a DC control signal 709 is generated from the PWM signal by means of a low-pass filter 702, wherein the value of the DC control signal is proportional to the duty factor of the PWM signal 701. This control signal is transformed by an amplifier stage 703 of constant gain into a signal range corresponding to the next stage which directly drives the light sources (LEDs) in the present case. For the sake of simplicity, the circuit shown in FIG. 24 contains only one LED and one phototransistor. The PWM signal 701 generated by the signal processing unit 502 is filtered by a two-stage passive RC filter, namely a low pass filter 702, the frequency cut-off of which is lower than the base frequency of the PWM signal 701, thus the analogue DC control signal 709 used at the output of the low-pass filter 702 is connected to the inputs $U_1$, $R_3$, $R_4$ of a non-inverting amplifier stage 703, which in addition to the amplification, also drives the input of the driver circuit 704. The input voltage of the driver circuit 704 and the base resistance $R_5+R_6$ of the transistor define the current of the collector of the transistor and also the current of the light source $D_1$ connected in series therewith. The signal processing unit 502 used for the light intensity regulation measures the voltage on the measuring resistor $R_{10}$ connected in series with the phototransistor by means of an A/D converter (ADC), wherein the measured voltage is proportional to the current of the phototransistor and consequently, also to the intensity of the incident light.

Figure 25:
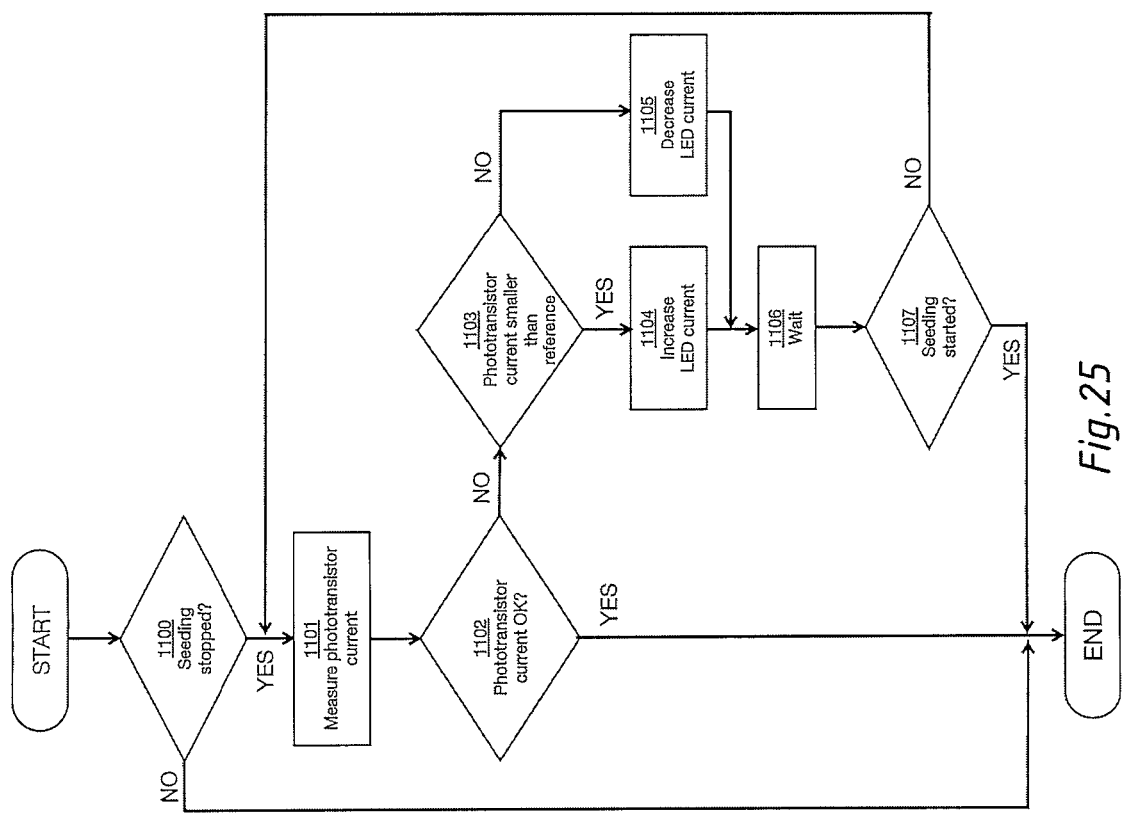
FIG. 25 is a flow diagram showing the major steps of the operation of the sensitivity adjustment system used in the seed sensors according to the invention.

The major steps of the sensitivity compensation carried out by the signal processing unit 502 are shown in FIG. 25. The sensitivity compensation is preferably performed during the turn-around of the seeding machine at the end of the land. Thus the reduction of the sensitivity resulted from the dust trouble of the windows arranged in the seed sensor can be substantially compensated during seeding between two runs. Accordingly, the control unit starts the regulation cycle in the step 1100 if it does not detect seeds for a given period. If this was the case, then in step 1101 the signal processing unit 502 measures the work point current of the phototransistor(s) and thereafter in step 1102 it checks whether the current value is within the desired range. If so, there is no need of modifying the light intensity and the regulation cycle terminates. However, if in step 1103 it is determined that the current of the phototransistor(s) is out of the desired range, then in steps 1104 and 1105 the light intensity will be corrected into positive or negative direction, respectively. After the adjustment of the light intensity, in step 1106 there is a predetermined holding period between the adjustment of the light intensity and the next measurement of the work point current of the phototransistor(s). This holding period allows that the next measurement provides a steady current intensity value. Additionally, in step 1107 the signal processing unit 502 monitors in every cycle whether in the mean time the flow of seeds has started in the sensor and it suspends the light intensity regulation immediately when the seeding has restarted. Due to the software-based regulation of the light intensity, the seed sensor is capable of determining if the seed sensor has a dust trouble. This is determined in such a way that if it cannot detect an appropriate light current at the phototransistors even at a maximum light intensity, then it means that it is not possible to regulate any longer, which means an excessive dust trouble with a high likelihood. This case is preferably indicated by switching of a LED light status.

The invention claimed is:

1. A seed counting sensor (200) for pneumatic seeding machines, said sensor comprising:
   a detection chamber (210) within a housing (204), said detection chamber allowing seeds to pass through the sensor and having a center axis (211) extending in a flow direction of the seeds (102);
   a plurality of light sources (240) arranged within the housing (204), outside the detection chamber (210), at predetermined distances from each other, said light sources being in a plane (P) extending substantially perpendicularly to said center axis of the sensor,
   a plurality of light detectors (250) arranged within the housing (204), outside the detection chamber (210) at predetermined distances from each other, said light detectors being in the same plane (P) as the light sources, wherein the number of the light detectors equals to the number of the light sources, and
   a signal processing unit (502) for controlling operation of the light sources (240) and for processing electronic signals produced by the light detectors (250),
   wherein the sensor further comprises optical masks (230) arranged in front of the light sources (240) and the light detectors (250), respectively, and made of a non-transparent material, said optical masks having a plurality of parallel channels (231) opening into the detection chamber (210), wherein the number of the channels equals to at least the number of light sources or the light detectors, wherein the channels have smaller diameter than that of optical lenses (241, 251) of the light sources and the light detectors, and wherein the optical lenses of the light sources and the light detectors closely fit to outer ends of the channels,
   wherein the light sources (240) are separated from each other by non-transparent partitions,
   wherein a minimum length of the channels (231) is dimensioned so that an entire amount of the incident light received by a light detector (250) is emitted by a light source (240) arranged directly opposite thereto, and
   wherein said light sources and said light detectors are arranged in said plane (P) so that they are capable of scanning an entire cross section of said detection chamber (210), and
   wherein said signal processing unit (502) is configured to determine signal lengths associated with the seeds, to determine an average signal length of the sensor over a predefined period of time and to send the average signal length of the sensor to a central processing unit for determining blockage of the sensor.

2. The seed counting sensor according to claim 1, wherein the light sources (240) are LEDs and the light detectors (250) are photodetectors.

3. The seed counting sensor according to claim 2, wherein the LEDs and the photodetectors operate in an infrared range.

4. The seed counting sensor according to claim 1, wherein the optical masks (230) are made of rubber or plastic.

5. The seed counting sensor according to claim 1, wherein it further comprises a control circuit for regulating light intensity of the light sources (240) as a function of light intensity detected by the light detectors (250).

6. A method of detecting blockage of a seed conveying pipe of a seeding machine having a central processing unit and a plurality of optical seed counting sensors, the method comprising the step of
   during a seeding period, continuously measuring electronic signal lengths of seeds by means of said seed counting sensors, the seed signal length being defined as the width of an electronic pulse of an optical seed counting sensor, said pulse width being proportional to a time period during which a moving seed blocks incident light of a light detector of said optical seed counting sensor, and
   at predetermined intervals the following steps are carried out:
   a) in each seed counting sensor, determining (1001) an average seed signal length for the given period by means of a signal processing unit of the seed counting sensor,
   b) forwarding said average seed signal lengths from the signal processing units of the seed counting sensors to the central processing unit of the seeding machine,
   c) at the central processing unit, determining (1002) a median of the average signal lengths over all of the seed counting sensors for a given period, thereby producing a common reference signal length for all seed counting sensors with respect to the given period,
   d) obtaining (1003) an upper limit signal length greater than the reference signal length by multiplying the reference signal length with a sensitivity factor having a value greater than 1, and
   for each seed counting sensor, the following steps are carried out at the central processing unit of the seeding machine:
      determining if the seed counting sensor is in a blocked state (1004a), and
         if the seed counting sensor is in a blocked state, then
            if the average signal length is greater than a previously stored upper limit signal length (1004b), the blocked state is maintained and the previously stored upper limit value will be used as the upper limit signal length in the given period (1005),
            otherwise the seed counting sensor is changed to a non-blocked state (1006) and the currently determined upper limit signal length and its corresponding reference signal length is stored (1007),
         if the seed counting sensor is in a non-blocked state, then
            if the average signal length is greater than a currently obtained upper limit signal length (1004c), the seed sensor is changed to a blocked state (1005),
            otherwise the non-blocked state of the seed sensor is maintained (1006) and the currently determined upper limit signal length and its corresponding reference signal length is stored (1007).

7. The method of claim 6, wherein at least one of the optical seed counting sensors comprises
- a detection chamber (210) within a housing (204), said detection chamber allowing seeds to pass through the sensor and having a center axis (211) extending in a flow direction of the seeds (102);
- a plurality of light sources (240) arranged within the housing (204), outside the detection chamber (210), at predetermined distances from each other, said light sources being in a plane (P) extending substantially perpendicularly to said center axis of the sensor,
- a plurality of light detectors (250) arranged within the housing (204), outside the detection chamber (210) at predetermined distances from each other, said light detectors being in the same plane (P) as the light sources, wherein the number of the light detectors equals to the number of the light sources, and
- optical masks (230) arranged in front of the light sources (240) and the light detectors (250), respectively, and made of a non-transparent material, said optical masks having a plurality of parallel channels (231) opening into the detection chamber (210), wherein the number of the channels equals to at least the number of light sources or the light detectors, wherein the channels have smaller diameter than that of optical lenses (241, 251) of the light sources and the light detectors, and wherein the optical lenses of the light sources and the light detectors closely fit to outer ends of the channels,
- wherein the light sources (240) are separated from each other by non-transparent partitions,
- wherein a minimum length of the channels (231) is dimensioned so that an entire amount of the incident light received by a light detector (250) is emitted by a light source (240) arranged directly opposite thereto, and
- wherein said light sources and said light detectors are arranged in said plane (P) so that they are capable of scanning an entire cross section of said detection chamber (210).

* * * * *